INVENTORS
JAMES L. QUINN
ORVILLE T. KNUTSON
WILLIAM H. DREYER
by: Wolfe, Hubbard, Voit & Osann
ATTORNEY

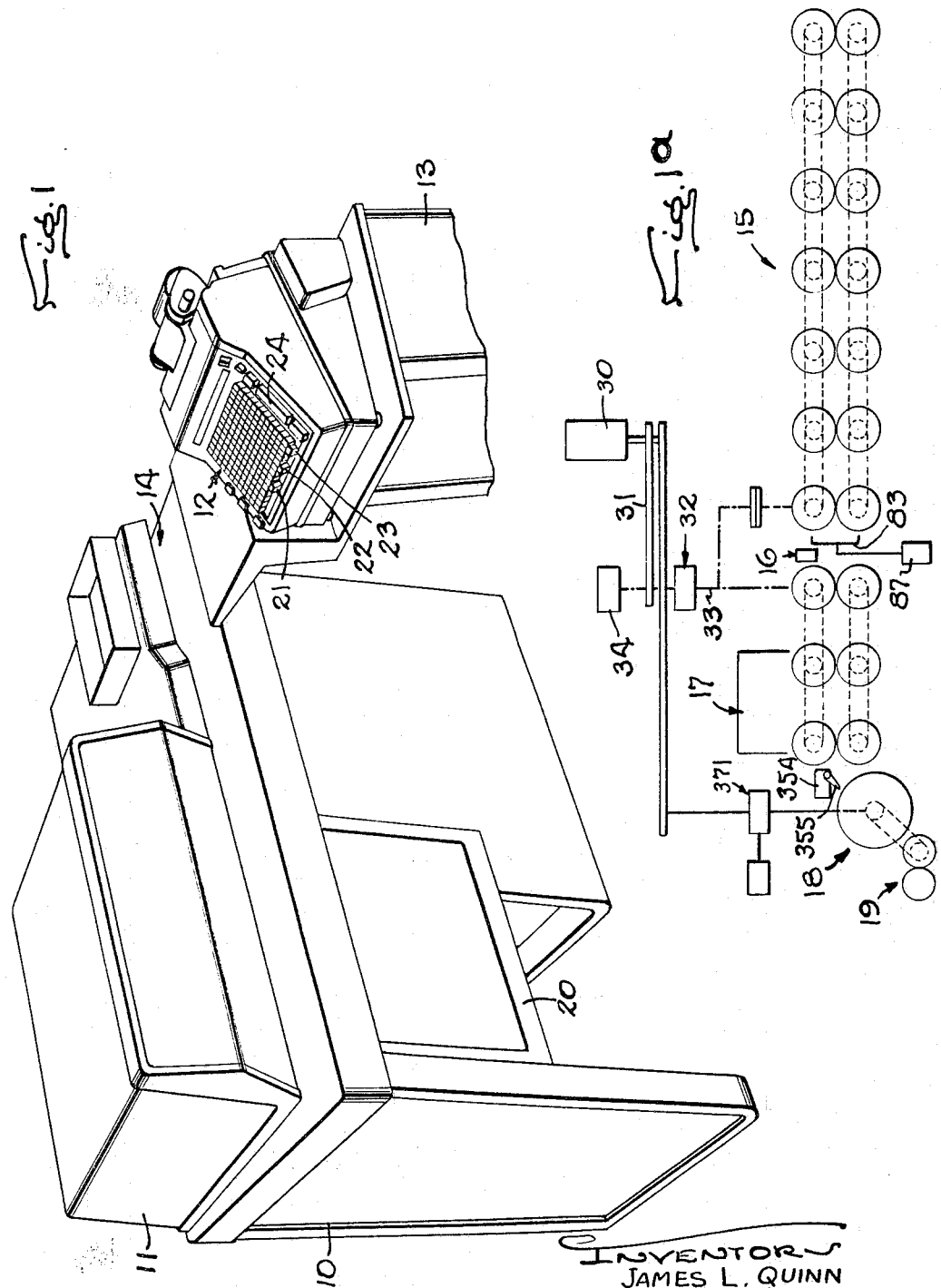
Sept. 27, 1966     J. L. QUINN ET AL     3,275,232
PROOF ENCODER AND PERFORATING SYSTEM THEREFOR
Filed Nov. 5, 1963     14 Sheets-Sheet 1
INVENTORS
JAMES L. QUINN
ORVILLE T. KNUTSON
WILLIAM H. DREYER
by: Wolfe, Hubbard, Voit & Osann
ATTORNEY Sept. 27, 1966          J. L. QUINN ET AL          3,275,232
            PROOF ENCODER AND PERFORATING SYSTEM THEREFOR
Filed Nov. 5, 1963                              14 Sheets-Sheet 2
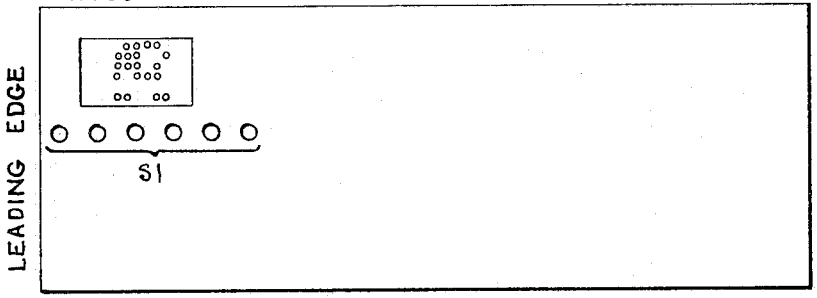
*Fig. 2* (PREQUALIFIED)
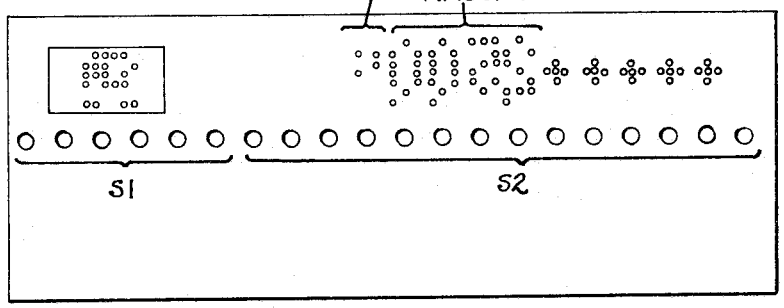
*Fig. 2a*
*Fig. 3* (UNPREQUALIFIED)
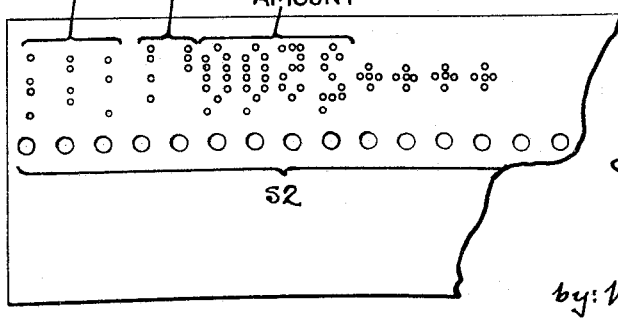
*Fig. 3a*
INVENTORS
JAMES L. QUINN
ORVILLE T. KNUTSON
WILLIAM H. DREYER
by: Wolfe, Hubbard, Voit & Osann
ATTORNEYS

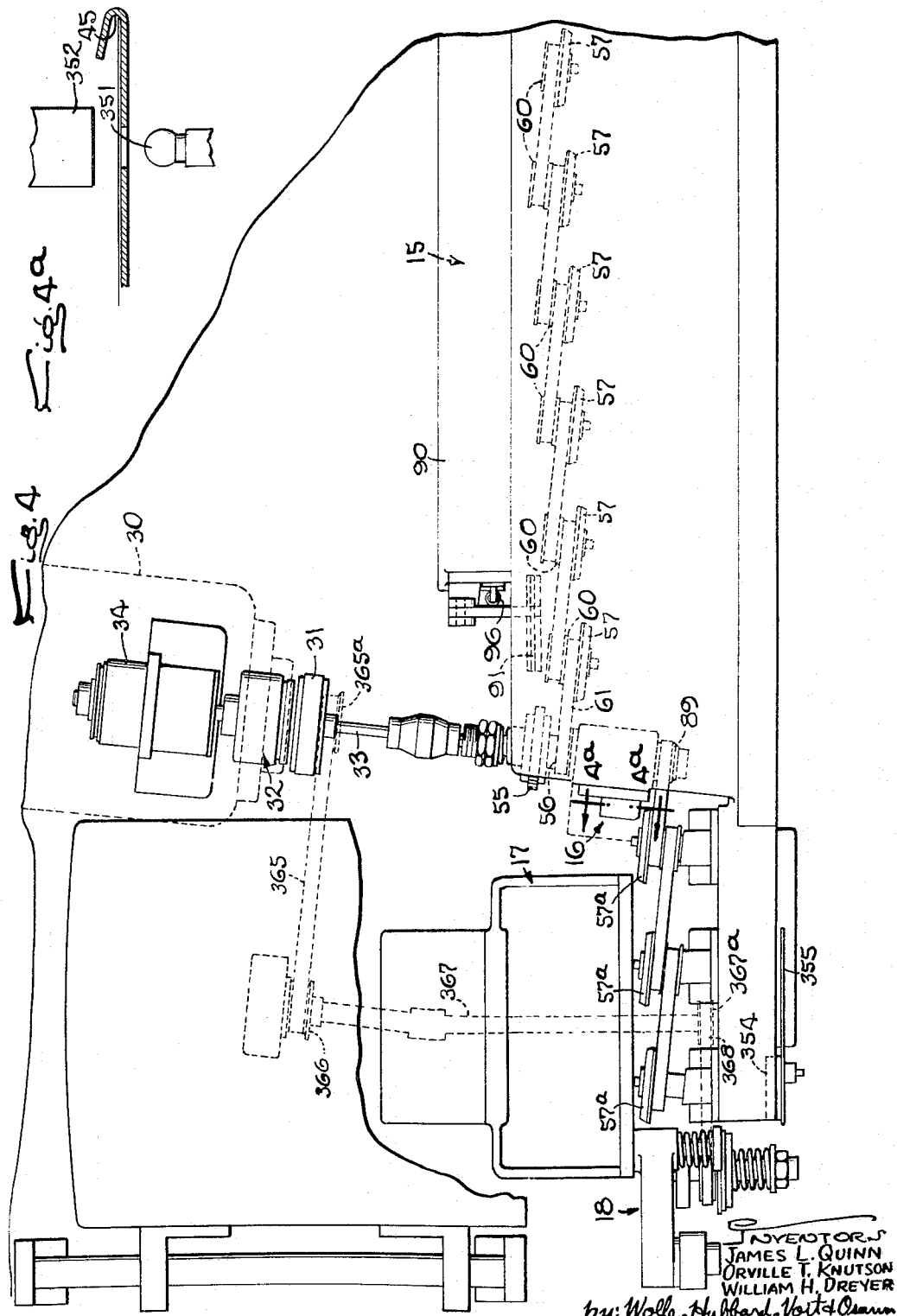

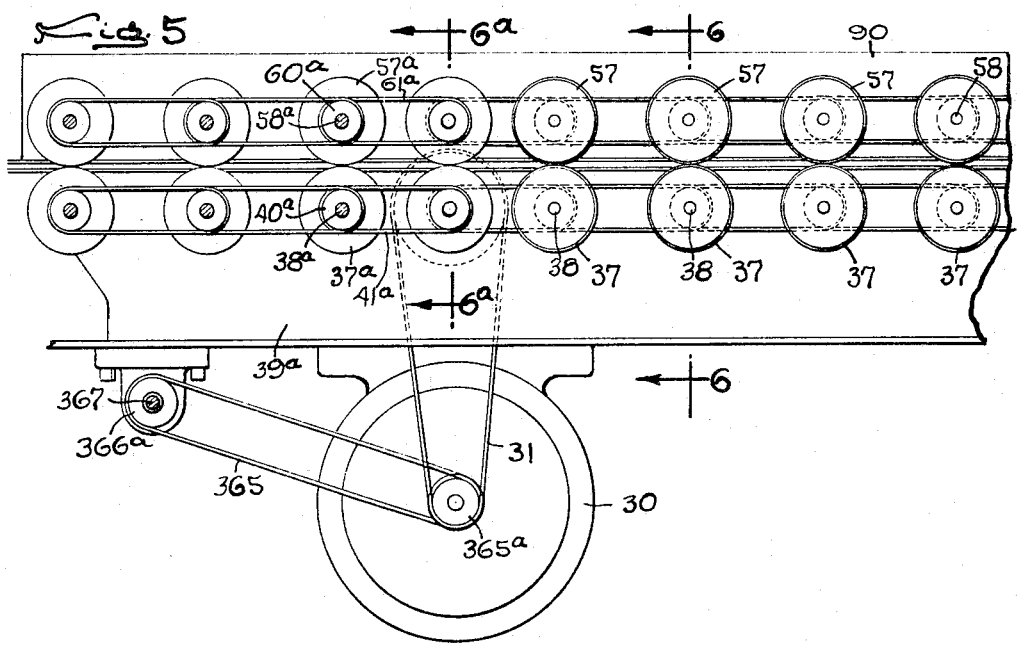

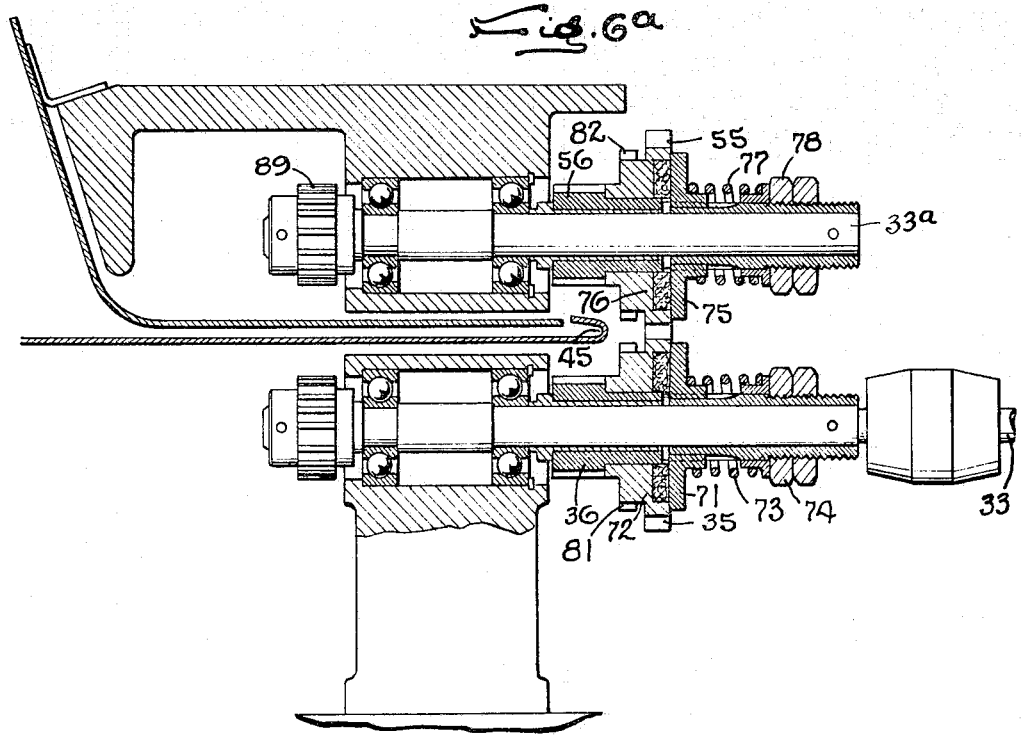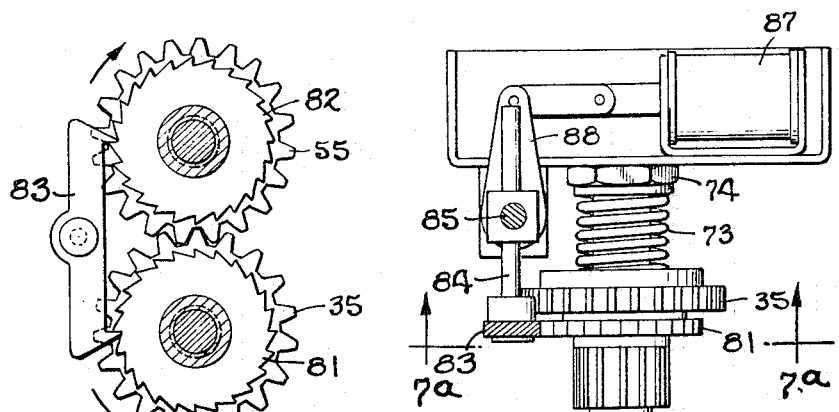

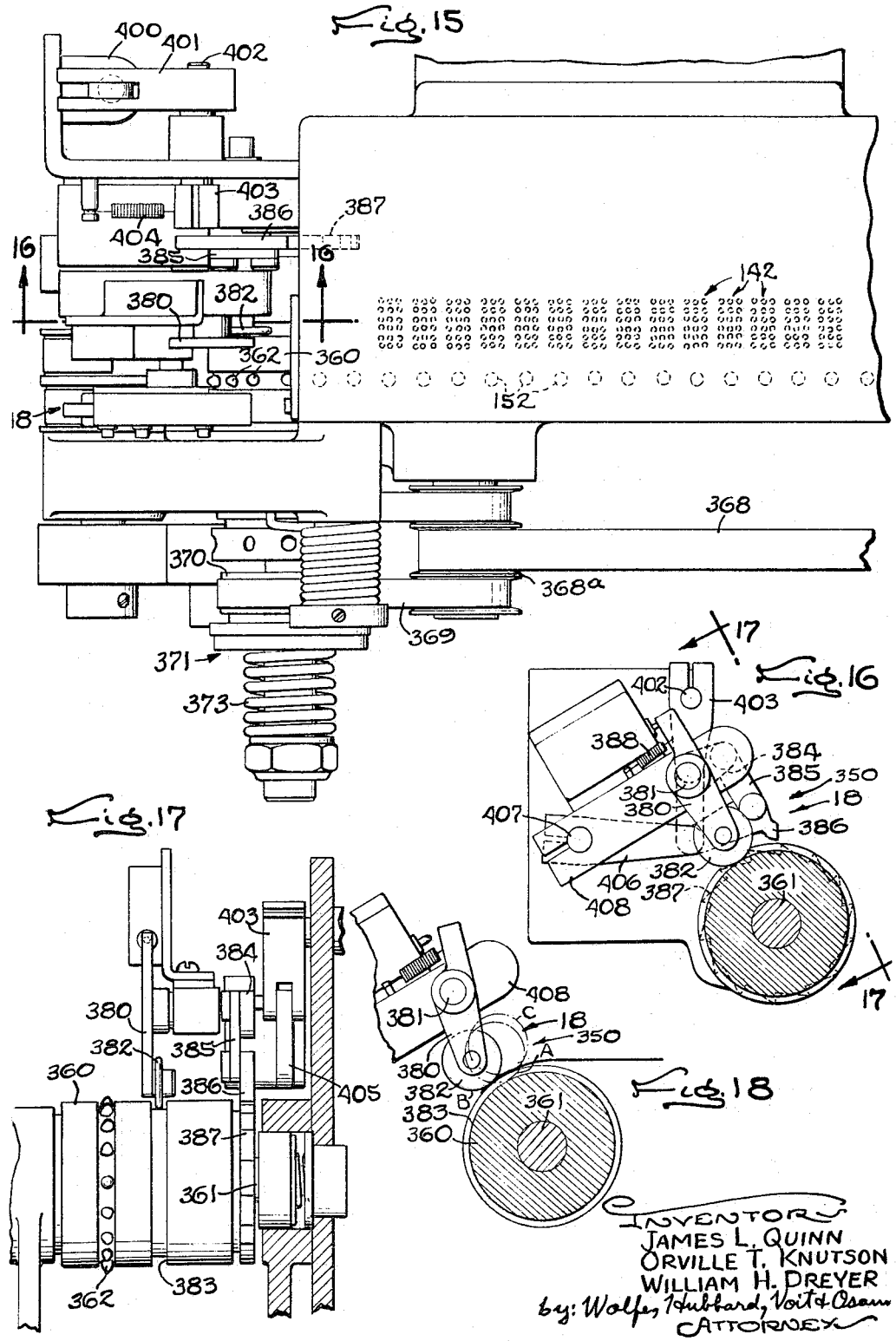

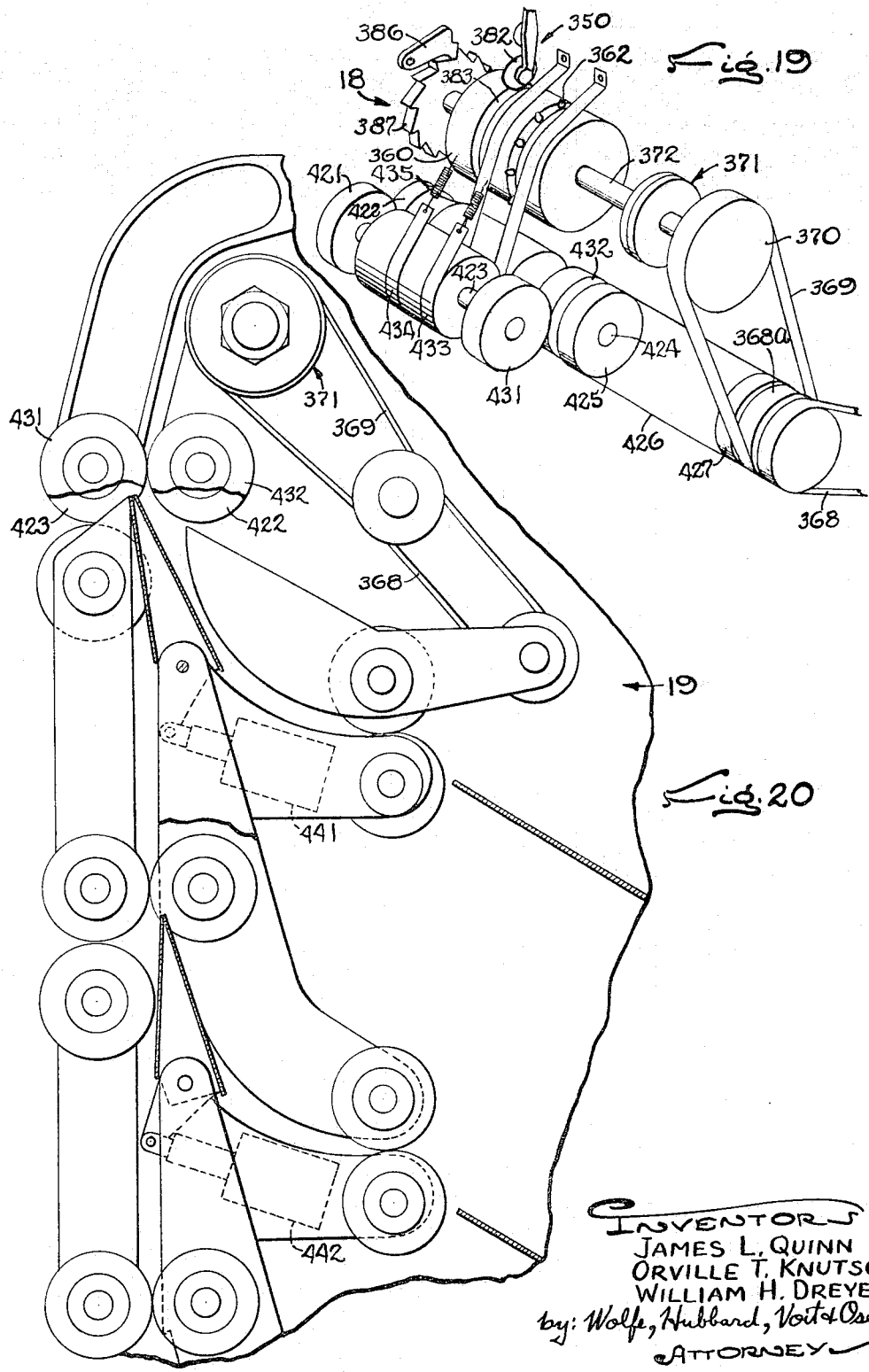

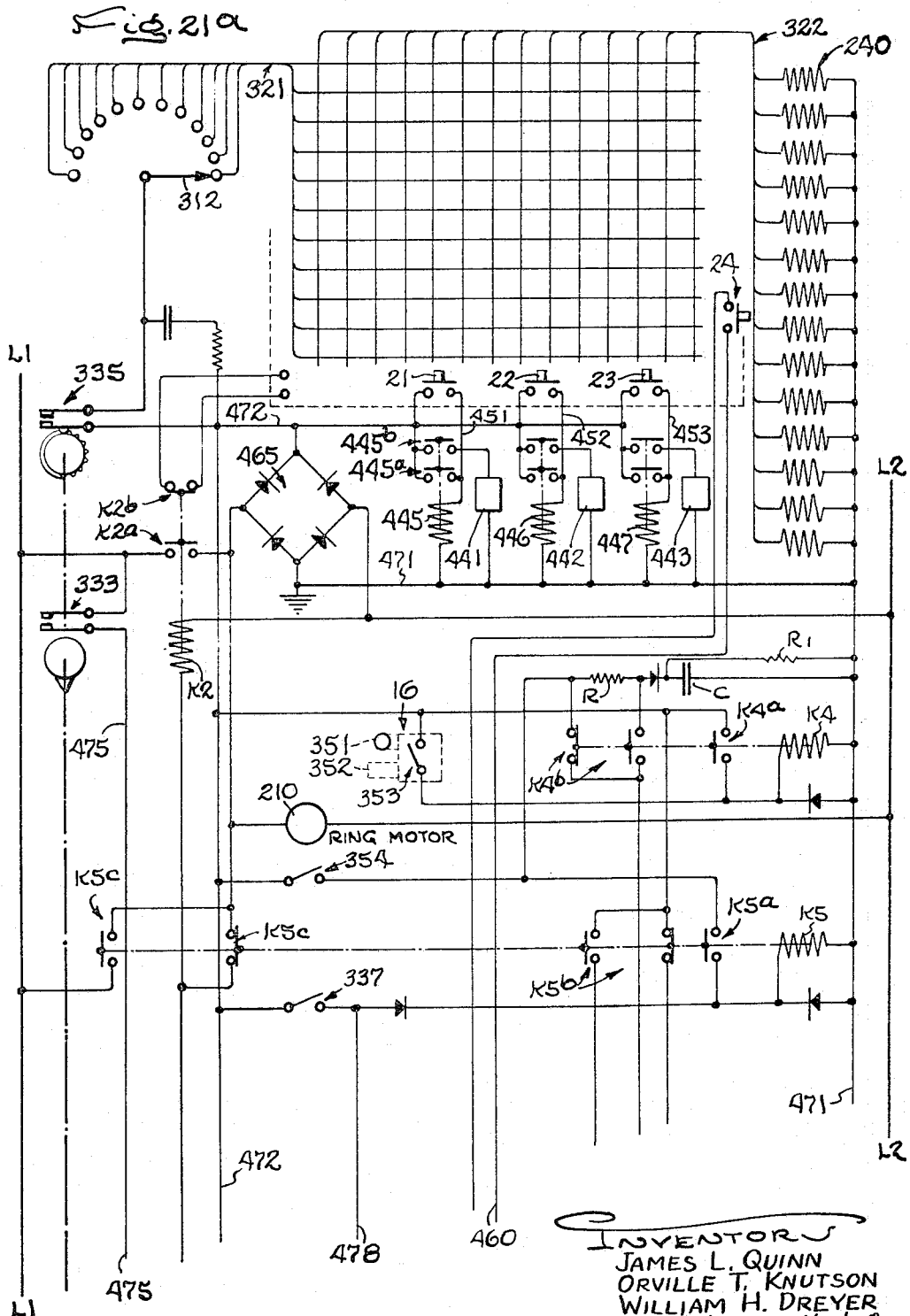

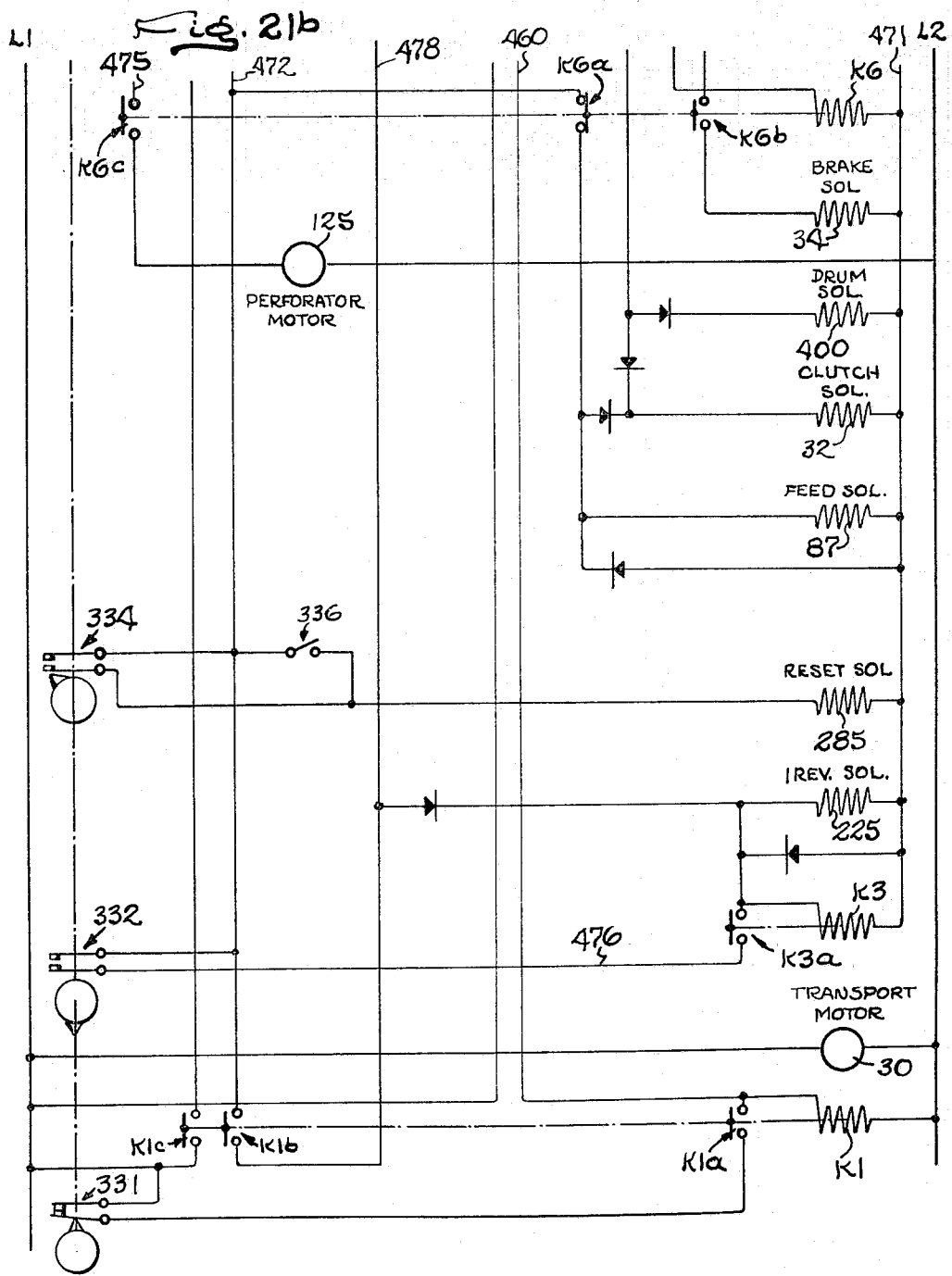

3,275,232
PROOF ENCODER AND PERFORATING SYSTEM THEREFOR
James L. Quinn, Chicago, Orville T. Knutson, Libertyville, and William H. Dreyer, Skokie, Ill., assignors to Cummins-Chicago Corp., Chicago, Ill., a corporation of Illinois
Filed Nov. 5, 1963, Ser. No. 321,608
27 Claims. (Cl. 234—1)

The present invention relates to a perforation system for documents and more particularly to a device for entering proof information on checks or the like for later processing by automatic reading equipment.

While the present invention is not limited to the processing of bank checks and deposit slips, the features and advantages of the invention may nonetheless be most clearly seen by describing the apparatus in connection with typical bank usage. When a check is presented for payment to a bank teller, the teller makes payment, making a record of the transaction, and passes the check to the bookkeeping department for a second or "proof" entry which is later checked against the teller's own account. In all except the smallest banks automated bookkeeping equipment is employed in which the proof entry, i.e., the amount of the check and other information, is entered upon the check itself for later "reading" by automatic equipment at rates on the order of several hundred checks per minute. Such automatic reading requires, however, that the information to be "read" be in a form which the machine will recognize. Two encoding schemes, both using visually legible indicia, are in common usage, the first employing perforations, which may later be read by an appropriate photocell reader, and the second employing characters of magnetic ink which can be read by sensing with an appropriate magnetic pickup head. While certain aspects of the present invention are applicable to both of these encoding schemes, the present invention is directed primarily to an improvement in the entering of proof indicia in the form of perforated characters.

The problem of entering encoded proof information on the face of the check is complicated by the fact that the checks presented to the bank are not uniform but fall into a number of different categories. Thus some of the checks are "prequalified" with identifying information, capable of being read by a machine, already entered thereon, usually in the form of perforations at the time a book of checks is issued. Also, some of the checks, the so called "on us" checks, are chargeable against funds on deposit at the bank, whereas other checks which are "in transit" must be passed on for payment to other banks, requirement different treatment.

In the case of prequalified punched checks, the punched characters are accurately positioned with respect to drive sprocket holes to insure accurate reading.

However, since it is desired to keep the number of perforations on the face of a prequalified check to a minimum, it is common practice to defer the making of sprocket holes until the information is actually punched on the check, and, even then, sprocket holes are limited to a minimum number punched immediately adjacent the recorded information and in the same punching operation. It is desirable that the sprocket holes begin closely adjacent the "leading edge" of the check for prompt registering engagement with the sprockets in the reading equipment. Thus, on a prequalified check the space at the leading edge of the check is already taken up with prequalifying characters and their associated sprocket holes. In such event it is desirable for any further information which may be entered on the check, particularly the proof amount of the check, to occupy a "following" position, clear of the prequalifying characters but closely adjacent thereto and with the associated sprocket holes in exact sequential register with the initial set of sprocket holes already punched. Where, however, the check does not have any prequalifying information entered thereon, the space at the leading edge of the check is free for the entering of the proof amount of the check, customers account number (if "on us"), or the like. Indeed, in the case of a non-prequalified check, it is essential for such proof information to be punched at the leading edge in order to provide an initial set of sprocket holes for later engagement by the sprockets in the reading machine.

While the discussion refers specifically to checks, it will be understood that the invention is not limited to checks but is equally applicable to other documents which are susceptible to automatic processing. Thus deposit slips will normally be intermixed with checks, which raises the additional problem of identifying each document as a debit or as a credit transaction.

It is, accordingly, the primary object of the present invention to provide a proof encoding machine which is capable of entering the necessary proof and identifying information in proper position on checks or the like regardless of whether the checks are prequalified or non-prequalified. It is a related object to provide a proof encoding machine which may be easily operated, requiring simply the entering of the face amount of the check and brief identification on a suitable keyboard and the placing of the check in a feeding station for automatic transport through the machine without exercise of further care or attention. It is therefore an object of the present invention to provide a proof encoding machine which is capable of transporting an individual check, reading the check to determine whether there is any prequalifying information already perforated thereon and, depending upon the latter, locating the check in proper position relative to the perforating head so that the proof information is properly and precisely related to the prequalifying information without risk of obliteration or over-punching. Thus the operator need not be concerned with positioning of the check within the machine to insure entry on a clear area. Nor need the operator be concerned with feeding in checks more rapidly than the machine can accept them. On the contrary the speed, which is an inherent feature of the machine, exceeds that of the fastest operator, with provision for positively preventing two successive checks from being acted upon at the same time.

In one of the aspects of the invention it is an object to provide a perforating head having settable rings with novel means for setting them to a desired combination of settings in accordance with control pulses received from a control keyboard or the like. It is a related object to provide a perforating system including a perforating head and the necessary control therefore which is positive, accurate, and fast. It is an object to provide a perforator and setting means therefor which may be used in a novel and advantageous way as an integral part of a proof encoding system but which is, nevertheless, of general utility and readily incorporated in other systems wherever it is desired to set the rings of a perforating head by means of electrical pulses under remote control. It is a more specific object of the present invention, in one of its aspects, to provide a perforating head having novel means for setting the perforating control rings, which may in a typical case be fifteen in number, simultaneously rather than in sequence. Consequently it is an object to provide a perforating system which may be more rapidly set, permitting more rapid operation of the overall equipment, than has been possible heretofore. In this connection it is still another object of the present invention to provide a perforator which includes positively operating means for restoring all of the perforating rings to a reference or "home" position automatically after the perforation has been completed and between the setting up of successive numbers therein. In this connection, also, it is an object of the invention to provide a perforation system including a keyboard and novel synchronizing means so that the information read out of the keyboard is precisely synchronized with the rotation of the perforator rings with the result that each ring is deposited in the desired set position positively without any possibility of a false setting no matter how rapid the setting cycle.

It is a further object of the invention, in one of its aspects, to provide a proof encoding device for checks or the like having a novel transport mechanism in which each check is transported, in engagement with a reference edge, in position for interrogation by a detector located along the path of movement and with the transport mechanism having successive separately controlled sections to insure that the checks are transported one by one. It is also an object to provide a check transport mechanism which includes a check positioning drum subassembly which has novel means, triggered by the advent of the leading edge of a check, for stopping the drum promptly and with both the drum and check in a precise position for the entry of perforated information on the check.

It is a general object to provide a proof encoding machine for checks or the like, including novel control circuitry, in which the various functions are related in a novel way and so interlocked together that accurate entry of proof information in proper position on the check is assured.

Other objects and advantages of the invention will become apparent upon reading the attached detailed description and upon reference to the drawings in which:

FIGURE 1 is a perspective view of a proof encoding system constructed in accordance with the present invention.

FIG. 1a is a diagram showing the driving means employed in the device of FIG. 1.

FIG. 2 shows a typical prequalified check as received by the operator of the machine.

FIG. 2a shows the check of FIG. 2 after the encoding process.

FIG. 3 shows a corner of a non-prequalified check as received by the operator.

FIG. 3a shows the same check after the encoding has been completed.

FIG. 4 is a fragmentary top view of the transport drive mechanism.

FIG. 4a is a fragmentary section taken along the line 4a—4a of FIG. 4.

FIG. 5 is a front view of the transport mechanism of FIG. 4.

FIGS. 6 and 6a are transverse sections taken along the lines 6—6 and 6a—6a of FIG. 5.

FIG. 7 is a fragmentary view of the drive solenoid used for controlling rotation in the two transport sections.

FIG. 7a is a view looking along the line 7a—7a of FIG. 7.

Figure 8:
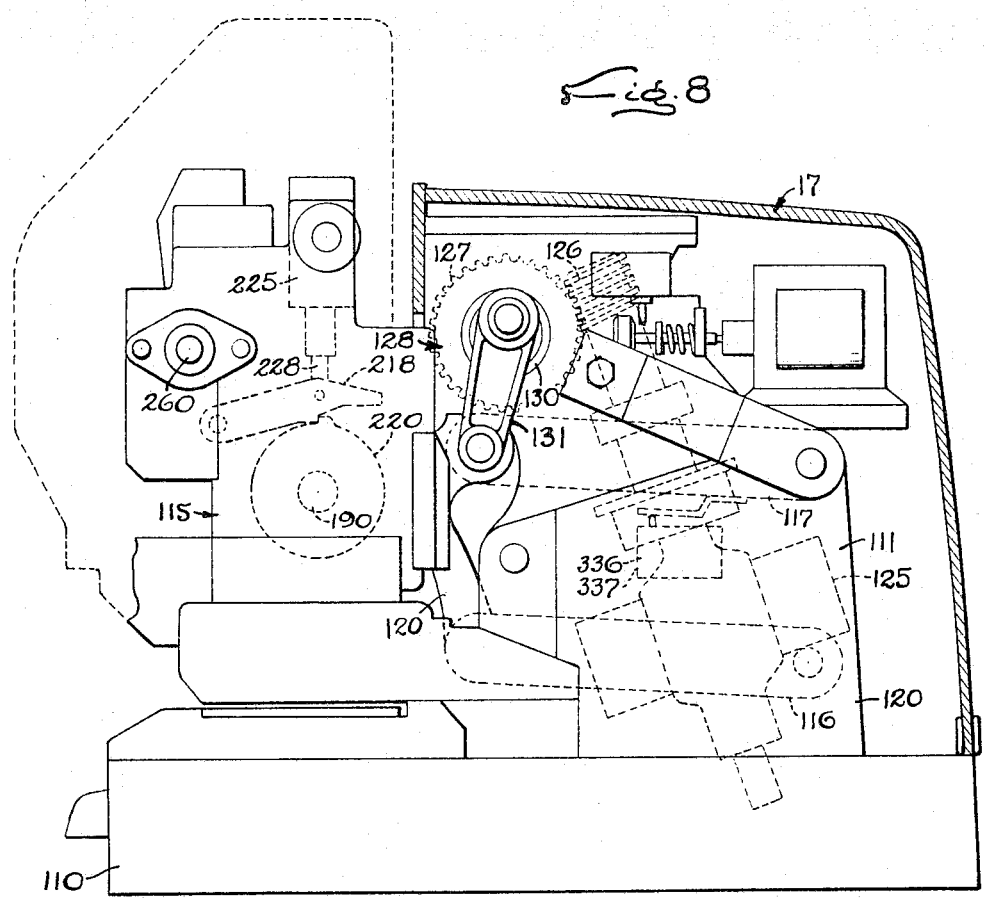

FIG. 8 is an elevation view, in partial section, showing the perforator mechanism including the means for reciprocating the perforator head.

Figure 9:
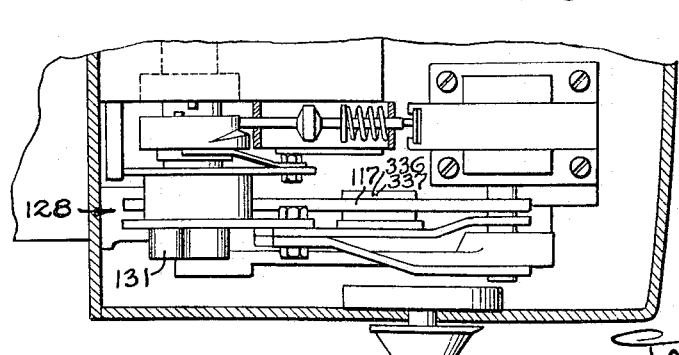

FIG. 9 is a fragmentary top view of the mechanism shown in FIG. 8 and showing the single revolution clutch.

Figure 10:
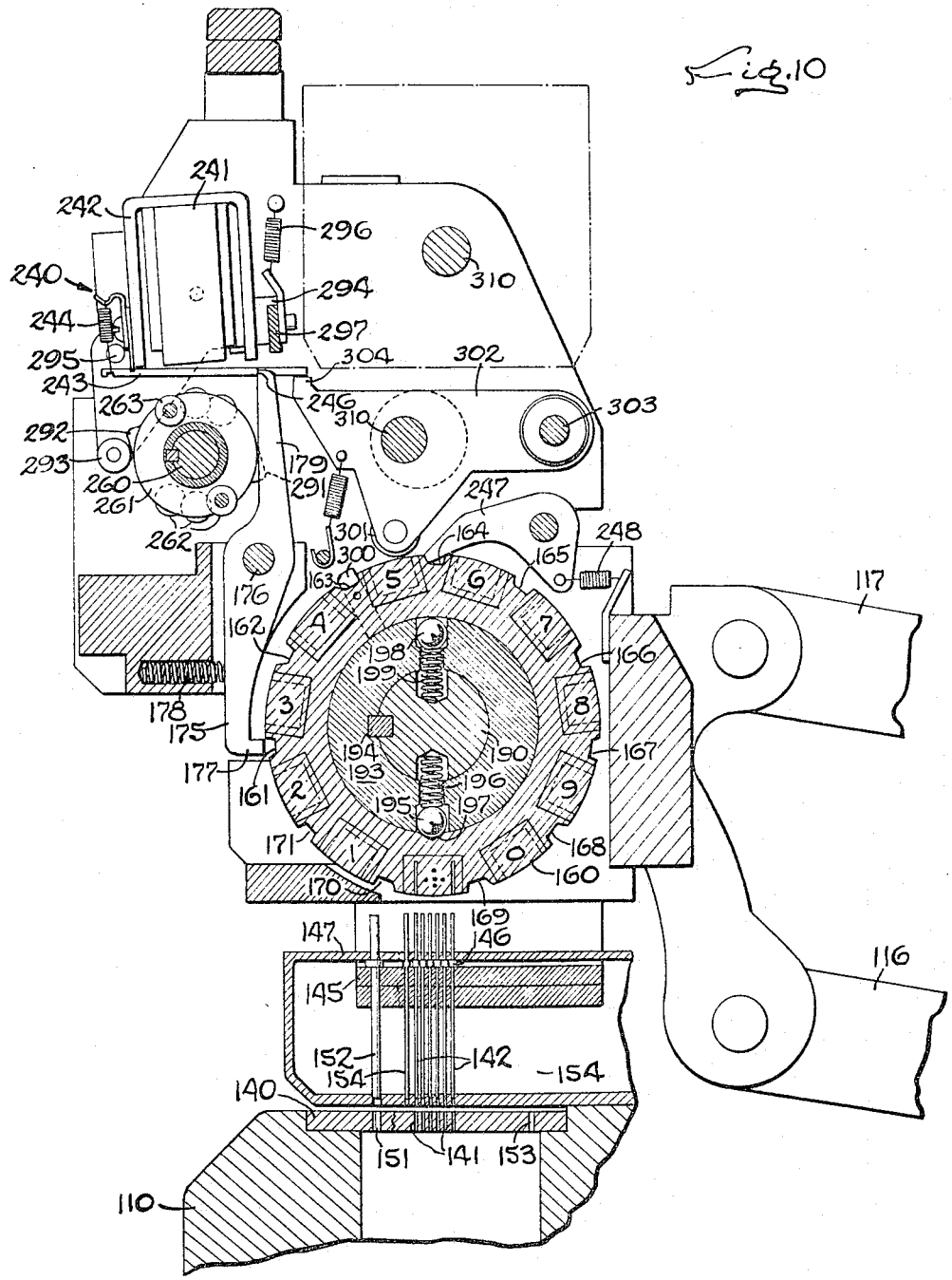

FIG. 10 is an enlarged vertical section showing the mechanism in the perforating head.

Figure 11:
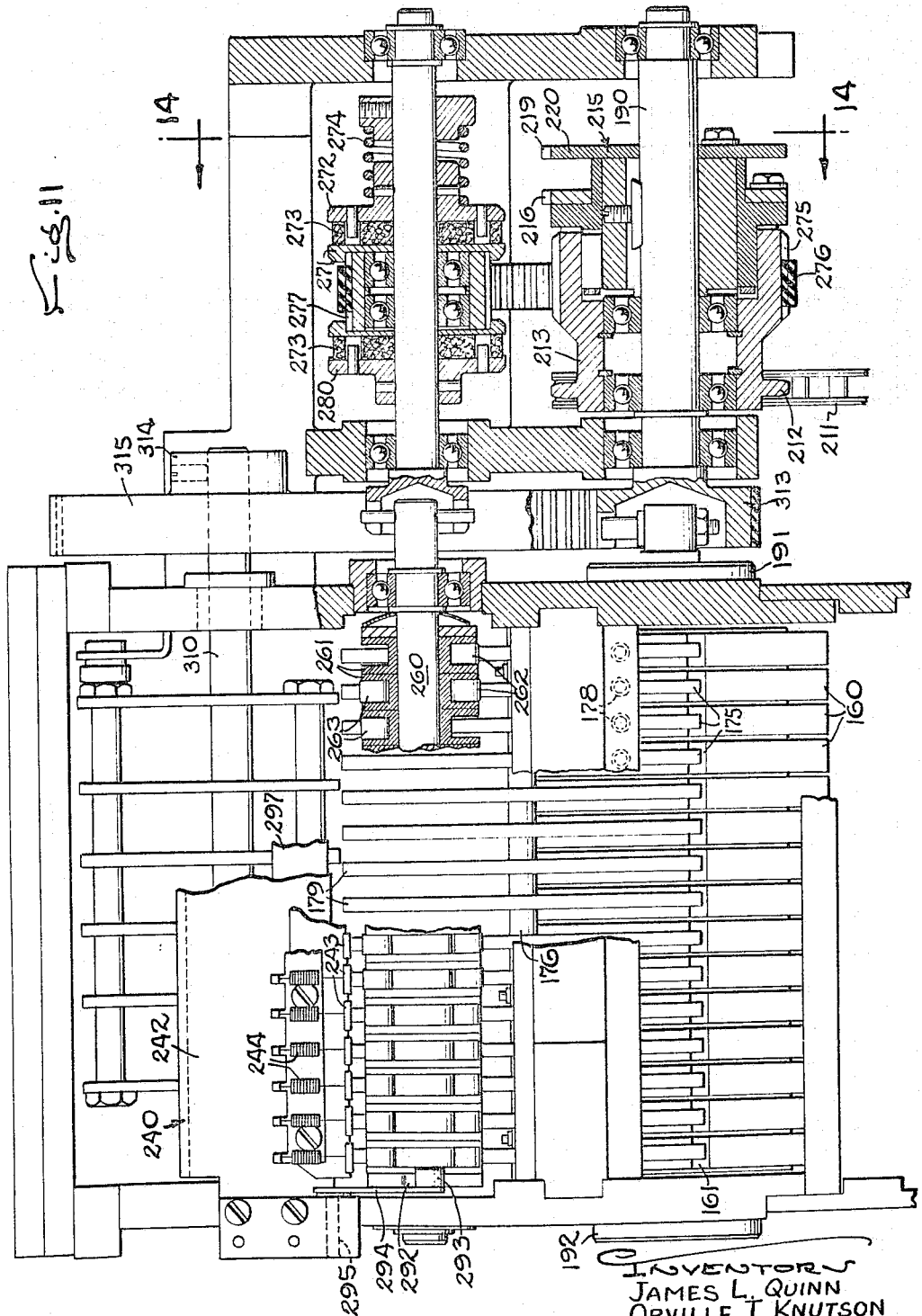

FIG. 11 is a front view of the mechanism shown in FIG. 10 with certain parts broken away to reveal underlying structure.

Figure 12:
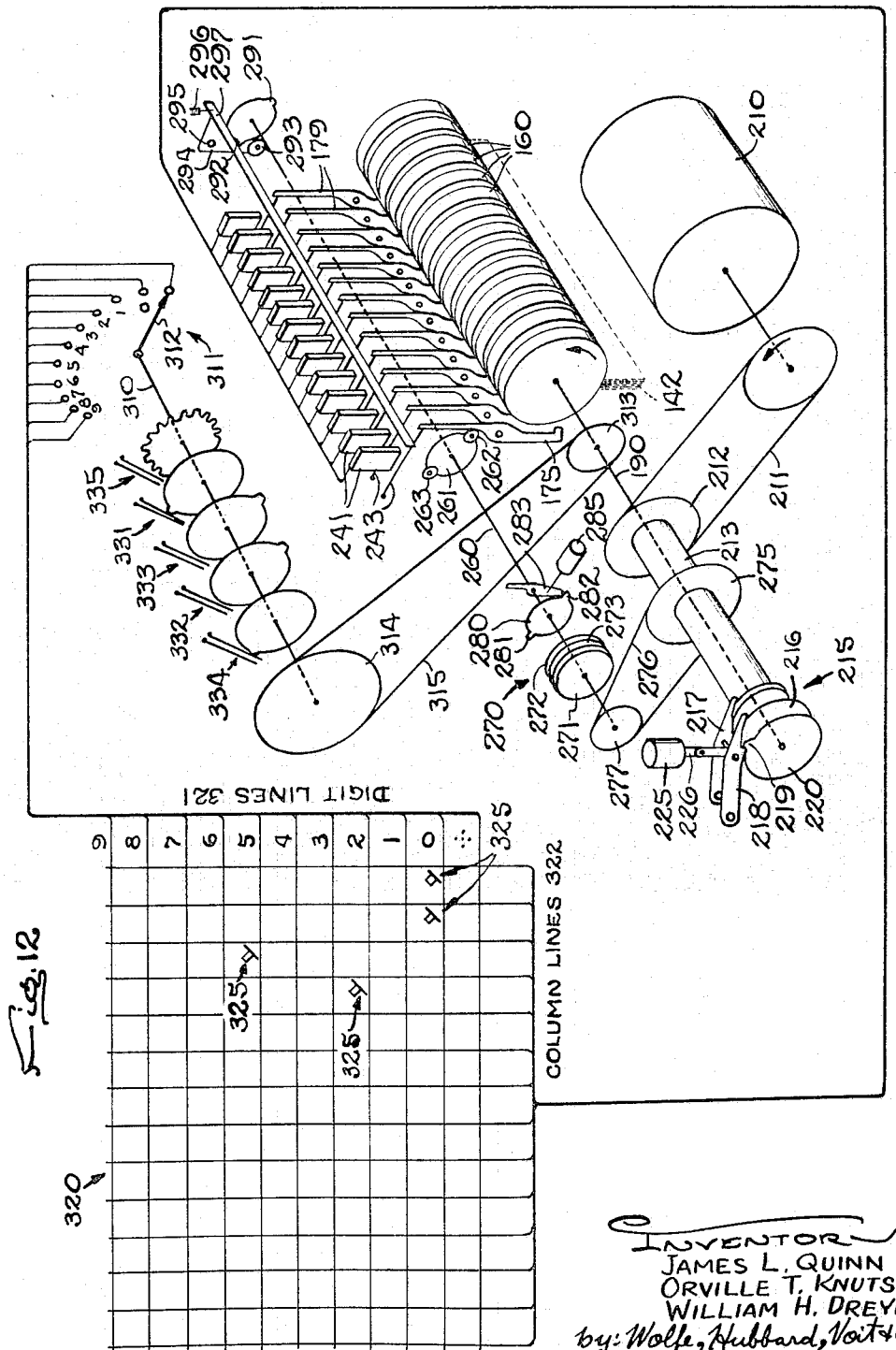

FIG. 12 is a perspective diagram showing the means for driving the ring setting shaft, the resetting shaft, and commutator shaft as well as the control matrix associated with the latter.

Figure 13:
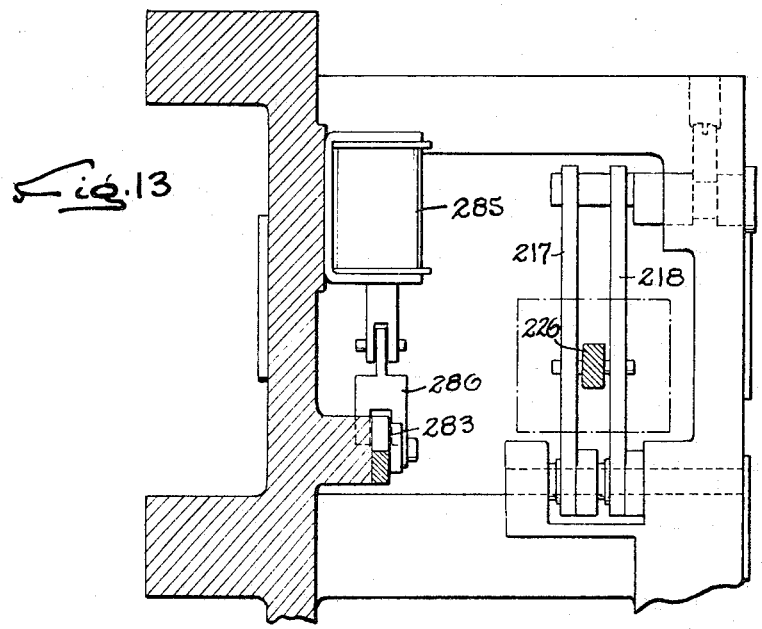
Figure 14:
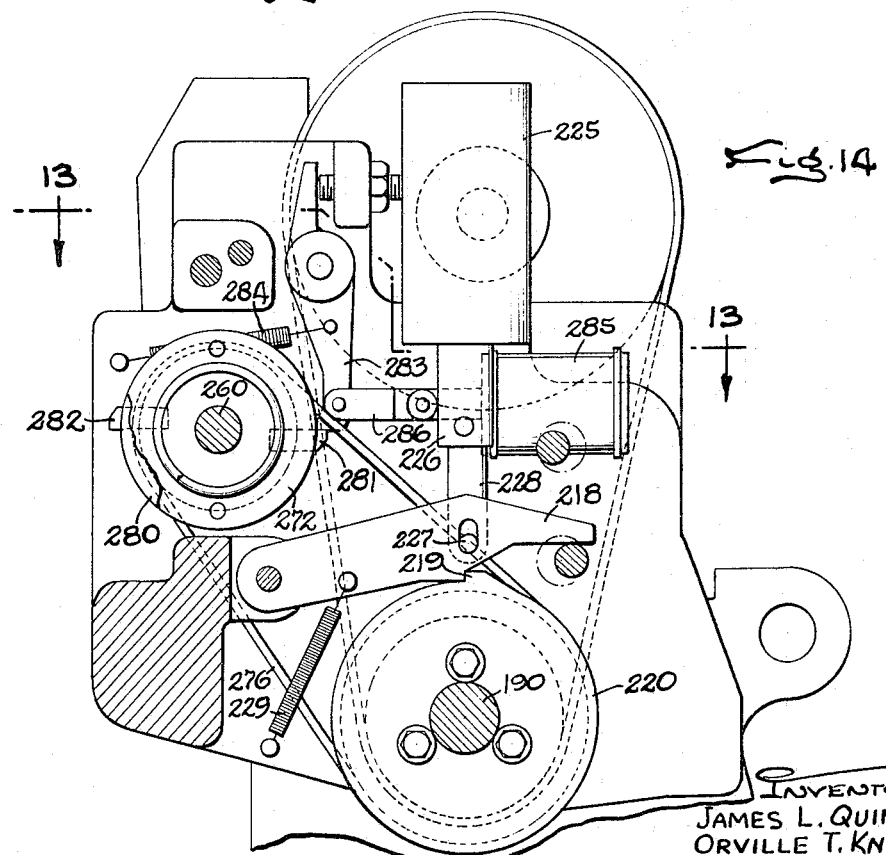

FIG. 13 is a fragmentary section taken along line 13—13 of FIG. 14.

FIG. 14 is a section taken along line 14—14 in FIG. 11.

FIG. 15 is a fragmentary plan view showing the drum employed for positioning and ejecting checks.

FIG. 16 is a fragmentary section taken on line 16—16 in FIG. 15.

FIG. 17 is a section taken along the line 17—17 of FIG. 16.

FIG. 18 is a fragment showing the movement of the feeler wheel which occurs upon advent of a check.

FIG. 19 is a perspective showing the ejector rollers at the output of the drum.

FIG. 20 is a front view with parts broken away showing the deflector arrangement for deflecting the checks into the respective pockets.

FIGS. 21a and 21b constitute a control diagram for controlling the machine set forth in the preceding figures.

While the invention has been described in connection with a preferred embodiment, it will be understood that we do not intend to be limited to the particular embodiment shown but intend to cover the various alternative and equivalent constructions included within the spirit and scope of the appended claims.

Turning now to the drawings, FIGURE 1 shows a perspective view of the apparatus comprising a complete proof encoding system as it appears in use while FIG. 1a is a diagram showing the main mechanical elements. The device is preferably in the form of a console having a frame 10 mounting a housing 11 with an associated adding machine type keyboard 12 on a stand 13. The keyboard may be that disclosed in National Cash Register Company Schematic Wiring Diagram For Adding Machines No. 461–44000 dated Oct. 18, 1961.

The checks or the like are fed into a horizontal feed slot 14. Within the housing 11 is a transport mechanism 15 (FIG. 1a), a perforation detector 16, a perforating mechanism 17, and a check positioning mechanism 18. A diverter mechanism 19, at the outlet of the latter, causes the checks to be deposited in a receptacle 20 having a plurality of pockets. The keyboard, in addition to the regular column pushbuttons, includes selector pushbuttons 21–23 and a start or "transmit" pushbutton 24.

To understand the operation of the machine it is helpful to visualize typical checks, both as received by the operator and after operation of the machine, reference being made to FIGS. 2 and 3. FIG. 2 shows a prequalified "on us" check as received from the teller with the account number in coded form in the upper left hand corner of the check adjacent the leading edge and with associated sprocket holes S1. Since the check is prequalified, the operator simply enters the amount and the transaction code, in this case a debit, on the keyboard, selects a "pocket," if desired, and presses the transmit button 24. The check, upon leaving the machine, appears as in FIG. 2a, with the amount and transaction code punched in and with the added sprocket holes, S2, forming a sequential, i.e., uninterrupted, registering series with respect to the prior holes S1. Since the automatic accounting apparatus by which the check is to be later processed, requires feeding of data starting with the lowermost order, the punched data, with reference to the "leading edge" is in reverse but visually legible when viewed from the backside of the check. Where the check is not "on us" but in transit, then the operator, instead of entering an account number, enters a distribution number in a units and tens position.

In the case of an "on us" check which is non-prequalified, the check as received (FIG. 3) does not include any perforations but will normally have an account number printed thereon. The operator enters this account number along with the transaction code and amount on the keyboard, presses the transmit button and the check upon leaving the machine appears as shown in FIG. 3a with the perforated information and associated sprocket holes S2 being closely spaced with respect to the leading edge of the check. Finally, in the case of a non-prequalified transit check, the distribution number is entered rather than the account number.

In the case of deposit tickets, which are furnished to the operator along with the checks and intermixed therewith, the only difference is that a different transaction code is used, one indicating a credit rather than a debit. In addition to its function in the encoding process, the keyboard and its associated "adding machine" mechanism produces a tape giving the totals necessary for initial proofing. When the encoding of a batch of checks and deposit slips has been completed, the stacks are removed from the receiving pockets and loaded into an automatic reading and accounting machine which takes care of the posting and other bookkeeping operations.

It will be apparent as the discussion proceeds that the encoded information which has been mentioned above is merely exemplary and that additional information may be entered in coded form and which may or may not be visually legible depending upon the nature of subsequent processing.

*Transport mechanism*

Referring to the transport mechanism 15 (FIGS. 1a and 4–6), a transport motor 30 is used driving a belt 31 which engages the input element of a feed clutch 32 having an output shaft 33. Mounted at the rear end of the output shaft is a brake 34. The clutch and brake are of the electrically energized type and the control circuit, as will be seen, is so arranged that they are energized alternatively thereby to prevent coasting or overtravel when the clutch is deenergized. Mounted at the forward end of the shaft 33 is a drive gear 35 having an associated cog pulley 36. The latter serves to drive a series of drive discs 37, which may, for example, be seven in number and made of wear-resistant plastic. The drive disc assemblies are identical and one of such assemblies, that shown in FIG. 6, may be taken as representative. Thus is will be noted that the drive disc 37 is mounted on an angled shaft 38 which is secured to a mount 39. Close coupled to the disc is a cog pulley 40 having a cog belt 41. The cog pulley is of double width to permit engagement by two belts side by side thereby permitting the disc assemblies to be driven from one to the next, in unison with one another. The discs 37 extend upwardly through appropriate apertures 44 in the feed table, the angling of each of the discs serving to crowd the check over into engagement with a reference edge member 45.

For engaging the top surface of the checks, a similar series of drive discs is provided in an upper framework 50. To drive the upper set of discs, a second drive gear 55 is provided having an associated drive pulley 56. The disc 57, taken as typical (FIG. 6) is mounted on a shaft 58, the disc being driven by a cog pulley 60 about which is trained a belt 61. The discs 37, 57 are arranged in respective alinement so that a check is gripped between the opposed edges. For applying just the right amount of driving friction, means are provided for biasing the disc 57 downwardly. Thus the disc shaft 58 is pivoted for vertical swinging movement on a pivot mount 62 which is biased in a downwardly swinging direction by a spring 63 having an adjustment 64.

For the purpose of controlling rotation of the drive discs, latchable slip clutches are used between the gear 35 and the cog pulley 36 and between gear 55 and cog pulley 56. Taking first the gear 35 and cog pulley 36, the two are provided with clutch discs 71, 72 respectively, urged together by means of a coil spring 73 tensioned by an adjusting nut 74. Similarly the gear 55 and cog pulley 56 have clutch discs 75, 76 urged together by a spring 77 adjusted by a nut 78.

For controllably latching the belt pulleys 36, 56 against rotation, the cog pulleys have integral ratchet wheels 81, 82 (FIGS. 7 and 7a) respectively which "face" in opposite directions and which are both engaged by a latch 83. The latch 83 is mounted for broadwise swinging movement upon an arm 84 which is mounted on a vertical pivot 85. Mounted at the other end of the lever is an adjusting screw to limit the degree of swing. For actuating the latch a feed solenoid 87 is provided pinned to an arm 88 at the lower end of the pivot shaft 85, the arrangement being such that when the solenoid 87 is energized the latch is disengaged, thereby permitting the drive discs 37, 57 to rotate.

To prevent feeding of a second check before a first check has cleared, and as will be described in detail, the drive discs are provided in two separate series, an initial series already described which extends from the feed station and the rotation of which is controlled by the feed solenoid 87, and a main series directly associated with the perforator and which operates as long as the feed clutch 32 is energized. Corresponding reference numerals are used for corresponding parts. For the purpose of rotating the lower discs in the main series a shaft 33a is provided directly coupled to the drive gear 35 and terminating in a cog drive pulley 89. Taking the disc 37a as typical, it is mounted on a shaft 38a secured to a mount 39a and having a cog pulley 40a engaged by a belt 41a. The upper discs are driven by a shaft 33a directly connected to the gear 55. The upper discs 57a, which is representative, is mounted on a shaft 58a having a pivot mount 59a and an integral cog pulley 60a engaged by a belt 61a. A spring 63a having a screw adjustment 64a serves to control the degree of driving friction.

For the purpose of providing access to the feed table, all of the upper discs 37, 37a are mounted in an upwardly swingable frame 90 having alined pivots 91, forming a hinge connection with the main frame. For the purpose of stopping the frame member 90 in its desired horizontal working position, the frame is provided with rearwardly extending arms 93 (FIG. 6) each of which carries a stop plunger 94 cooperating with a fixed stop 95 secured to the frame. To augment the force of gravity in keeping the upper frame 90 in its working position, a coil spring 96 is connected to each plunger.

It will be apparent, then, that when a check is inserted between the drive discs, with the feed clutch 32 and feed solenoid 87 energized, the check will be not only driven longitudinally but also, by reason of the angling of the disc shafts, crowded against the reference edge 45. The significance of this is that each check will be in the same lateral reference position by the time it reaches the detector and perforator provided only that the check is approximately oriented, with leading edge forward, at the time it begins its journey.

*Perforator unit*

In considering the mechanical aspects of the present device and prior to a discussion of the associated control arrangement, attention may be given to the construction of the perforating mechanism 17. For convenience, the device may be considered in two parts, the mechanism for mounting and reciprocating the head and the mechanism used for setting the rings for the punching of a perdetermined set of characters. For the details of the reciprocating mechanism, reference may be made to prior Dreyer et al. application Ser. No. 164,128. It will suffice to say in reference to FIG. 8 of the drawings that the unit has a base 110 mounting a frame 111. The reciprocating head 115 mounted at the front of the mechanism is secured to a parallelogram linkage including a pair of lower links 116 and a pair of upper links 117, the links being pivoted to the frame at the rear ends and to a bracket 120, forming a sort of head at their forward ends. For powering the reciprocating movement, a motor 125 is used, the motor shaft terminating in a worm 126 which engages a worm wheel 127 to provide speed reduction. For the purpose of insuring that the head makes only a single downward and upward movement per actuation, a single revolution clutch 128 is interposed at the output of the worm wheel having an output shaft 129 driving an eccentric 130. A pair of pitmans 131, only one of which is shown in FIG. 8, serve to connect the eccentric to the head 115.

With regard to the punches and the means for selecting them, reference may first be made to FIG. 10. Here it will be noted that the base 110 includes a die block 140 having openings 141 for receiving selected ones of the punches 142. It will be understood that the punches 142 are arranged in fifteen groups, each forming a matrix six units high and three units wide. Selector ring means are provided, for selecting or activating the punches in a particular combination within each group. Prior to discussion of the selector means it will be noted that the punches extend through a lifter plate 145 which engages enlargements 146 on each of the punch elements on the return stroke thereby retracting the punches from the work. A guide plate 147, having openings therein for each of the punch elements, serves to maintain the punch elements in perfectly vertical position. For the purpose of punching the sprocket holes, a row of openings 151 is formed in the die plate cooperating with punches 152 which are of somewhat larger diameter than the punch elements which form the characters. The auxiliary set of openings 153 in the die plate are engaged by parity check punches 154 which do not, per se, form a part of the present invention.

For the purpose of selecting the punches which are to be active in each group or column position, a plurality of selector rings 160 are provided having faces about the periphery in which certain of the matrix positions are drilled out and in which certain of the matrix positions are solid to serve as an anvil for exerting pressure upon the upper ends of the corresponding punches. In FIG. 10 these faces have been identified by the numerals 1–9 and 0 which they respectively represent. For the purpose of providing a character which is used simply to fill up unused column positions, an eleventh position is provided on the periphery of each selector ring which is designated "star" and which forms a distinctive star shaped character.

In order to stop the ring 160 with a selected one of the faces in active position, the ring is provided with notches 161–171 about its periphery, the notches being engageable by a vertically arranged latch 175, pivoted for movement about a horizontal axis 176 and having a hook 177 at its lower end. The latch is urged into engaging position by a spring 178. The latch is controlled, i.e., released and retracted, via its upwardly extending portion 179 which serves, for example to maintain a latch temporarily retracted during rotation of the ring 160.

In order to rotate all of the rings 160 simultaneously, they are coupled to a ring setting shaft 190 which is journaled in the head in bearings 191, 192. The driving force between the shaft 190 and the rings is transmitted via a detent. Thus, mounted within the ring 160 is a small annulus 193 which is keyed to the shaft by a key 194 and which carries at its periphery a ball 195 which is outwardly pressed by a spring 196 into a detent 197 formed on the inner surface of a ring 160. In order to balance the detenting force, a ball 198 is provided in the diametrically opposite position, outwardly pressed by means of a spring 199.

It will be apparent then, assuming the latch 175 to be retracted, that upon rotation of the shaft 190, the ball 195 pressing into the detent 197 will cause the ring 160 to be rotated in a counterclockwise direction as viewed in FIG. 10. When the latch is released to lock the ring, the ball 195 climbs out of the detent 197 and the remainder of the rotative cycle, as far as the ring 160 is concerned, takes place idly.

Attention may be given to the means for driving the ring setting shaft 190 before turning to the latch control mechanism. Thus, as shown in FIG. 12, a driving motor 210 is provided driving a chain 211 which engages a sprocket wheel 212 formed on a drum 213. Interposed between the drum 213 and the setting shaft 190 is a single revolution clutch 215 having a release dog 216 cooperating with a release latch 217. For the purpose of stopping the shaft 190 upon completion of a single revolution a stop latch 218 is provided cooperating with a stop 219 mounted on a stop disc 220 which is secured to the shaft 190. For actuating the release latch 217 and the stop latch 218 simultaneously to produce a single revolution of the shaft 190, a ring clutch solenoid 225 (FIG. 14) is used which is coupled to a solenoid armature 226 connected to a shaft 227. The release latch 217 is coupled to the armature 226 by means of a drop link 228. For the purpose of applying downward bias to the release latch 217 a coil spring 229 is provided. At the other end of the shaft 227 the stop latch 218 is radially secured.

The single revolution clutch 215 does not per se form a part of the present invention and various commercial single revolution clutches of well known design, may be used. The operation is as follows: When the ring clutch solenoid 225 is energized, the release latch 217 is raised and the stop latch 218 is simultaneously disengaged. This lets the single revolution clutch undergo one complete revolution. Since the energization of the solenoid 225 is momentary, as will be seen in connection with the control circuit diagram, the stop latch 218 is immediately released so that it returns to a position in the path of movement of the stop 219 thereby stopping the shaft 190 in a precise terminal position. By the time that the shaft 190 has made a complete revolution, all of the rings 160 will have been set to a predetermined position in readiness for the downward stroke of the perforator head.

For the purpose of releasing the latch 175 at a desired phase position of the ring 160, the latch 175 is provided with a latch release device 240. Similar to a relay, the release device has a coil 241, a magnetic yoke 242 and a magnetic armature 243, the armature normally occupying an open or dropped out position by reason of bias applied by a spring 244. It will be understood that the latch release device 240 is of special "narrow" construction so that the devices may be closely spaced side by side, one for each of the latches 175.

In the present device the underside of the armature 243 has a shoulder 246 which engages the extreme upper end 179 of the latch 175 to hold the latch open, i.e., disengaged from the cooperating ring 160, until such time as the coil 241 is energized. When the release device receives an energizing pulse, the armature 243 is drawn upwardly releasing the latch 175 so that it is free, under the urging of the spring 178, to drop into the oncoming one of the notches. For the purpose of preventing rebound, the ring 160 is provided with an anti-retrograde latch or keeper 247 which is biased by a spring 248.

For the purpose of resetting all of the latches 175 associated with the rings 160, a bail shaft 260 is provided which extends parallel to the upper ends 179 of the latches (see FIGS. 10 and 12). Spaced along the bail shaft 260 are discs 261 mounting a first group of rollers 262 and a second group of rollers 263, the rollers being alined with the individual ones of the latches. In carrying out the invention, means are provided for applying constant torque to the bail shaft 260 and for releasing it so that it may turn through a half revolution during which all of the latches 175 are reset. Thus, a slip clutch 270 is used having an input element 271, an output element 272 with a pair of felt washers 273 between them. Endwise pressure is exerted by means of a coil spring 274 at the end of the shaft. For the purpose of constantly rotating the input element 271 at relatively high speed, a direct drive is provided between the input element and the motor driven sprocket drum 213 (FIG. 12). Thus there is integrally formed on the outside of the drum 213 a cog wheel 275 over which is trained a cog belt 276 which encircles an input pinion 277 at the clutch input. For the purpose of releasing the shaft 260 to undergo a half revolution, there is fixed to one end of the shaft (FIG. 14) a stop disc 280 having diametrically arranged dogs 281, 282 engageable by a latch 283. The latch is urged to its engaged position by a spring 284. A reset solenoid 285, arranged near the latch and coupled to it by a link 286, is momentarily operated to lift the latch so that it clears the dog which it engages.

Thus, to summarize the operation of the bail shaft 260, constant rotation of the motor 210 causes constant rotation of input disc 271 but the shaft is, nevertheless maintained stationary by the latch 283. When the reset solenoid 285 is pulsed, lifting the latch 283, the torques exerted through the slip clutch causes the shaft to rotate until the opposite dog, after rotating 180°, comes into contact with the latch, terminating further rotation. The rollers 262 are staggered so that the latches are set one by one in quick succession without imposing a high torques load upon the bail shaft 260 and the slip clutch which drives it.

In order to insure that the armatures 243 associated with the latches are dropped out in each cycle of operation, in other words, to preclude any "sticking" of the armatures, an armature knockout cam is provided on the bail shaft 260 having two cam lobes 291, 292 which press against a cam follower 293. The cam follower is mounted upon a rocker arm 294 which is horizontally pivoted at 295 being held in the normally retracted position by a spring 296. Secured to the end of the arm 294 and arranged opposite the tips of all of the armatures 243 is an armature knockout bar 297. The cam lobes 291, 292 are so phased that during the portion of the cycle when all of the magnetic releases should have dropped out the arm 294 is cammed clockwise bringing the bar 297 down against any armature which may be stuck in its upper position.

In carrying out the invention, each of the rings 160 moves twice during a complete cycle of operation, the first time from the "home" position to a "set" position and the second time from the "set" position to the "home" position in readiness for a succeeding cycle. Thus means are provided for releasing the latch 175 just prior to the time that the ring completes the second portion of the movement and as required to latch the ring in its "home" position. For the purpose of accomplishing this, the ring 160 carries a cam 300 cooperating with a cam follower 301 mounted upon a cam follower arm 302 pivoted along a horizontal axis 303. The tip 304 of the cam follower arm cooperates, as shown, with the tip of the armature 243. Thus, as the ring is rotated by the shaft 190, it will arrive at the point of movement where the cam 300 engages the cam follower, rotating the arm 302 clockwise and lifting the armature 243 clear of the latch 175 which is then free to drop into "home" position.

In accordance with the present invention, an electrical setting matrix is provided having a plurality of digit lines and a plurality of column lines, with the column lines being connected to the respective magnetic release devices associated with the perforator rings and with the digit lines being commutated by means coupled to the ring setting shaft so that all of the rings are set simultaneously to predetermined digit positions. This is to be contrasted with prior remote ring setting arrangements in which the rings are set successively column by column rather than simultaneously. More specifically, in accordance with the invention, means are provided for commutating the matrix digit lines once during alternate cycles of the ring setting shaft so that one revolution of the ring setting shaft is effective to set all of the rings, with the subsequent rotation of the shaft being available to restore all of the rings to the "home" position. Thus, referring to FIG. 12, we provide a commutator shaft 310 driving a commutator 311 having a wiper 312 engaging contact which occupy 180° and with means for driving the shaft at half speed relative to the ring setting shaft 190. The driving means consists of a cog pinion 313 on the shaft 190 which is one half the diameter of the cog gear 314 on the shaft 310 both encircled by a cog belt 315. The arrangement is such that as the shaft 190 sweeps through a complete revolution during the setting portion of the cycle the commutator shaft 310 sweeps through 180°, sending pulses of current successively through the digit lines and dropping out the latches (and thus setting the rings) in each column position which has been set, by the matrix, to respond to a predetermined digit.

In order to be able to visualize the operation reference is made to the keyboard matrix 320 at the left hand side of FIG. 12 in which the digit or input lines are indicated collectively at 321 and the column or output lines at 322. Each point of crossing between the lines represents a settable contact and pushbuttons, four of which are indicated at 325, are provided in each of the fourteen column, and eleven digit, positions for making contact when the pushbuttons are depressed during the normal setting up of the keyboard. To take a simple example, let it be assumed that the sum of $25.00 has been entered on the keyboard as illustrated by the pushbuttons 325. Thus as the shaft 190 rotates from its "home" position, with accompanying rotation of the wiper 312 of the commutator switch, the first contact to be "made" will be the "0" contact of the commutator switch. Since the wiper of the switch is connected, as shown, to a voltage source, a pulse of current will be sent along the "0" digit line into the matrix and, since the line in the lowest order column and the line in the second to the lowest order column are both connected to the "0" digit line, a pulse will flow out to the release coil 241 associated with the latches controlling the rings of lowest and second lowest order. Consequently, notches in such rings will be engaged causing both of the rings to be latched in their "0" positions. Since pulses of current do not go out to the magnetic releases in the other column positions, the other rings continue to rotate. When the wiper 312 passes through the "one" position nothing happens since the "one" digit line is not connected to any column line in the matrix. However, when the wiper reaches contact number two, the line in the fourth to lowest column position receives a pulse since the "two" button in this column has been depressed. Consequently, the ring in the fourth to lowest column position is latched in position to punch a "two." Nothing occurs at contacts three or four. However, when the wiper reaches digit contact number five, a pulse is transmitted into the fifth digit line which contacts the column line in the third to lowest order, thus tripping the latch in the ring of third to lowest order at the "five" position. Assuming that no other information has been entered on the keyboard, the wiper of the commutator will sweep idly through the sixth, seventh, eighth, and ninth digit positions without any further release of rings. Thus, when the setting cycle is complete, the rings of the perforator head will be set to indicated $25.00 in the four column positions of lowest order.

The above example is somewhat of an oversimplification since in entering the information of the keyboard required to set up the pattern of FIG. 3a, the operator will normally enter the account number and transaction in the low order columns prior to entering the actual amount. It is clear, in any event, that the rings in the perforator head correspond to the columns in the adding machine keyboard and that the rings will be automatically set to a rotated position corresponding to whatever digit pushbuttons have been depressed in the corresponding column positions.

In carrying out the present invention, switches associated with the commutator shaft 310 are provided for triggering and interlock purposes, i.e., to inform the remainder of the control circuit whether the rings have reached, or are in, the "set" position following completion of the first half of the cycle or whether the rings have reached, or are in, the "home" position as a result of completion of the total cycle. Thus switch 331 (FIG. 12) is a cam switch having lobes which cause the contacts to be made when the rings are in "home" position, while switches 332, 333 are cam switches in which the contacts are closed when the shaft 310 turns 180°, i.e., when the rings are in their "set" position. Switch 334 is so phased that momentary contact is made just prior to the time that the rings reach their "home" position. Finally, a chopper switch 335, having a plurality of teeth thereon, is connected in series with the wiper arm on the commutator switch, the phasing being such that the load circuit is made by the switch 335 after contact is established in the commutator and broken before the commutator contacts are parted; in other words, the switch 335 carries the burden of making and breaking thereby to lengthen the life of the commutator contacts.

For the sake of completeness of the description of the perforator mechanism, mention may be made of the "head down" switch 336 which is closed momentarily after the head reaches its downwardly thrust position and the "head up" switch 337 which is closed momentarily during the return stroke, both of which serve to trigger a subsequent function in the control sequence. This will be covered in greater detail in connection with the control diagram.

*Check positioning arrangement*

In accordance with one of the important aspects of the present invention, means are provided for positioning an inserted check in a first position of register, in the event that there is no prequalifying information on the check, and in a second position, offset "downstream," but still within the perforating station, in the event that the check being fed into the machine does contain prequalifying information in the form of a pattern of punched holes. The presence or absence of holes, specifically the sprocket holes accompanying the prequalifying information, is accomplished by providing a sprocket detector 316 along the path of movement of the check in the transport mechanism. Any commercial detector may be employed for the purpose of detecting the sprocket holes and it is not necessary to dwell upon the details of construction. It will suffice to say that the device may include a light source 351 providing a bright spot of light in lateral alinement with the sprocket holes, a photocell 352, and the necessary relay circuitry, including either a magnetic relay or a static relay, so that an output signal is produced at output terminals 353 when the presence of sprocket holes is detected.

The control circuit is so arranged that in the absence of output signal from the detector, a leading edge trip switch 354, located in the transport mechanism at the outlet side of the perforator is operated by the advent of the leading edge of the check thereby to cause immediate stoppage of the transport mechanism with the check positioned so that the identifying and proof information perforated therein is perforated adjacent the leading edge. Switch 354 is preferably so constructed, with a feeler arm 355, that the switch contacts remain closed as long as a check remains under the feeler arm, as will be brought out more clearly in connection with the control diagram. However, in accordance with one of the aspects of the invention the leading edge switch is made temporarily ineffective by the presence of an output signal at the sprocket hole detector so that the check is caused to travel a short additional distance for positioning in a second position, with the result that the proof information which is entered on the check is punched in a clear space which is safely offset from the qualifying information. Moreover, means are provided at the second position for precisely positioning the check with respect to the sprocket holes already contained therein so that the additional sprocket holes which are punched into the check incident to punching of the proof information are in sequential register with the original holes.

Thus, in accordance with the invention, we provide at the outset of the perforator, and as an extension of the transport mechanism already discussed, a drum having sprockets thereon together with means for latching the drum in a precise position with the sprockets in register with the first few sprocket holes of the check.

Thus referring to FIGS. 15–19 which show the drum positioning mechanism 18, a drum 360 of light construction is provided having a shaft 361 and having a set of sprockets 362 about its periphery. For the purpose of rotating the drum 360 while enabling it to be locked in position upon triggering of a latch, a drive is provided employing a slip clutch. Thus starting at the inlet of the drive train, a cog belt 365 is provided which is trained about an input cog pulley 365a on the shaft of the transport motor 30, and a cog pulley 366 connected by a flexible shaft 367 to another pulley 367a. The motion is further transmitted through another pulley 367a and another cog belt 368 to a pulley 368a which drives a cog belt 369 trained about a cog pulley 370. The latter has a clutch 371 including an output element 372 which is connected to the drum shaft 361, and the amount of torque transmitted being dependent upon the adjusted pressure of a coil spring 373. Thus as long as the drum is not latched, it will rotate at normal peripheral speed. Such speed is slightly greater than the lineal speed of the transport mechanism to insure sprocket engagement.

However, in carrying out the invention means are provided for interposing a latch to stop further movement of the drum when a check is transported into contact with the drum. In the preferred construction the advent of the check is detected by rotation of an arm carrying a feeler wheel which rides in a groove formed in the drum adjacent the sprockets. Thus, referring to the drawings (FIGS. 15–17), an arm 380 is provided mounted on a shaft 381 and having a feeler member in the form of a wheel 382 riding in a groove 383 on the drum. Mounted at the opposite end of the shaft 381 is an arm 384 which is connected to a drop link 385 which is pinned to a latch 386 alined with a ratchet wheel 387 at the end of the drum. The feeler wheel 382 is rocked to a forward position in the groove, i.e., in the direction of the oncoming check by means of a spring 388 as shown by the dotted line in FIG. 18. An oncoming check, engaging its sprocket holes S2 and crowding into the nip between the wheel 382 and the drum, as shown at A in FIG. 18, causes the arm 380 to swing backward to position B against the biasing force of the spring 388, thus causing the latch 386 to be lowered into obstructing position in the ratchet wheel 387. Rotation of the drum is thus immediately stopped accompanied by slippage at the slip clutch 371. Since the sprockets on the drum are engaged and since the pitch of the teeth on the ratchet wheel corresponds to the pitch of the sprocket holes, precise positioning of the check with respect to the sprocket hole punches of the perforator is assured. In short, the sprocket holes S2 which are punched with the check in such position must be in accurate sequential register with the sprocket holes already in the check.

For the purpose of releasing the drum after the perforator has acted, a release mechanism is provided including a solenoid which is effective to simultaneously release the latch and to move the feeler wheel out of contact with the check so that the check may be passed by unobstructedly. Thus there is provided a drum solenoid 400 (FIG. 15) which is connected to an arm 401 having a shaft 402. At the opposite end of the shaft is a second arm 403 having a return spring 404. Extending from the arm 403 is a drop link 405 pinned to a drop link arm 406. The arm 406 is, in turn, pivoted on a shaft 407 which carries an arm 408 which bodily supports the shaft 381 of the feeler arm 380. It will be apparent, then, that when the solenoid 400 is energized, rocking of the arm 403 causes lifting of the arm 406 and upward swinging movement of the arm 408 which serves to radially retract both the latch 386 and the wheel 382.

The wheel 382 is thus free to swing forwardly to position C where it simply rides on the check until it drops off of the trailing edge, back into position A. The arm 403 and drop link 405 are so proportioned that upon drop-off they are free to move into a vertically alined, dead center relation. This prevents any retrograde movement of the solenoid upon arrival of the next prequalified check, thus insuring that the next check will be effective to swing the arm to position B to again move the latch into blocking position.

Check receiver

Prior to leaving this portion of the device, mention may be made of the outlet drive rollers which accept the check from the drum, as well as the deflector means. Thus there is provided a pair of rollers 421, 422 (FIG. 19) having shafts 423, 424 respectively. The shaft 424 carries a cog pulley 425 driven by a belt 426 which is trained about a cog drive pulley 427, the latter preferably being integral with the pulley 368a previously referred to. Mounted at the other ends of the shafts 423, 424 are auxiliary rollers 431, 432 which engage the other edge of the check. Stationary belts 433, 434 tensioned by spring 435 insures that the check is maintained fully seated on the sprockets as long as it is in engagement with the drum.

Whether the check is deposited in one or another of the pockets 20 is dependent upon the setting of the associated deflectors having solenoids 441, 442 respectively. If none of the solenoids is actuated, the check is deposited in the lowermost pocket. Turning to the control circuit diagram, FIGS. 21a, 21b, buttons 21–23 are provided on the keyboard for energizing a selected solenoid relay. Three relays are used designated 445, 446, 447 having contacts carrying subscript $a$ and $b$ respectively. These relays are energized via lines 451, 452, 453 which lead to pocket selector buttons on the keyboard. In the case of each of the relays, the contacts $a$ are used for sealing in the relay and the contacts $b$ are connected in series with the respective deflector solenoid. Thus momentary contact at the keyboard is effective to hold the corresponding deflector in deflecting position until the check has been stacked, following which the relay is dropped out in readiness for a subsequent instruction.

Control arrangement

Having understood the physical construction of the mechanical components included in the present system and the manner in which they interact with one another, the overall operation may be understood by reference to FIGS. 21a, 21b which constitute a schematic diagram of the control circuit. The control circuit may be readily understood by one skilled in the art from the diagram and by reviewing a typical control sequence without necessity for reciting all of the various electrical connections. It will suffice to say that electromechanical elements previously referred to are identified by the same reference numerals and that auxiliary diodes have been used for circuit isolation and protection in accordance with well known practice.

Power is received from A.-C. lines feeding A.-C. busses $L_1$, $L_2$. Relays K1–K6 inclusive are employed having contacts as indicated by the letter subscripts. Dot-dash lines have been employed to relate a given relay with its various contacts. Whether a contact is normally open or normally closed is indicated by its state as shown in the control circuit.

With regard to the circuit of the perforator unit itself, this is fully disclosed in the pending Dreyer et al. application Serial No. 164,128 referred to above. As there disclosed, application of an electrical pulse to the input terminal is effective to cause the driving motor to produce one, and only one, down and up cycle of the perforator head, with the "head down" switch 336 being momentarily energized near the bottom of the perforation stroke and switch 337 on the return.

Condition No. 1—Non-prequalified check

The setting up of a number on the keyboard matrix has already been described in connection with FIG. 12, so this aspect of the invention need not be repeated in the overall description. It will simply be assumed that the operator has entered the required information on the keyboard, in the case of a non-prequalified customer check the account number, transaction code and amount. Finally, it is assumed that the operator has pressed one of the pushbuttons 21–23 for actuating a selected deflector.

With all of the information entered, the operator presses the "transmit" button 24 which causes a pulse to be applied to a start pulse line 460. This picks up a first relay K1 closing contacts K1a, K1b and K1c. Assuming that the perforator is in its "home" position, ready for reception of setting instructions, switch 331 therein is closed. This completes the circuit, through K1c, to the relay K2 which closes contacts K2a thereon and opens contacts K2b. It may be noted that the contacts K1a perform a temporary sealing function to insure that a positive input signal is applied to relay K2 even though the start pulse on the incoming line 460 may be indecisive or of short duration.

Energizing relay K2 opens the normally closed contacts K2b associated therewith which locks up the adding machine keyboard (by means not shown) thus insuring that no further information may be entered until the encoding cycle has been completed. Closure of contacts K2a on this relay performs three functions: In the first place, the relay is sealed in via normally closed contacts K5c. Secondly, a circuit is completed from the A.-C. supply lines to the bridge rectifier 465 causing D.-C. voltage to be applied to the D.-C. bus lines 471, 472. Finally, the circuit is closed to the ring setting motor 210 so that the motor begins to turn. With the D.-C. supply energized, current is supplied through relay contacts K1b to the ring clutch solenoid 225 so that the single revolution clutch 215 begins to turn the ring shaft 190 of the perforator. As the shaft 190 and the associated commutator shaft 310 start to turn the switch 331 on the latter opens, thereby dropping out the temporary holding circuit for relay K1. The resulting opening of the contacts K1b thereon, while removing power from the ring clutch solenoid 225 does not affect the rotation since, once the single revolution clutch is released, it follows through to complete a full rotation. Nor does the opening of contacts K1c affect relay K2 since this relay is sealed in via contacts K2a.

As the wiper 312 sweeps over the commutation contacts, with the contacts of switch 335 being closed in synchronism therewith, a positive pulses of current from the bridge rectifier 465 are sent in succession over the digit lines 321. As previously described, the column lines 322, which constitute the output from the keyboard, transmit the pulses to the magnetic release devices 240 in accordance with the contacts set up in the matrix so that all of the perforator rings, moved simultaneously by the ring shaft 190, are latched at appropriately indexed positions with their settings duplicating the settings of the pushbuttons on the keyboard. As the ring shaft completes one revolution, and upon the commutator shaft's completing one-half revolution, the contacts of switches 332, 333 are closed. The switch 333 thus "enables" the line 475 which triggers the perforator; however, the perforator is not actually operated since the contacts K6c in series therewith are, at this point, open. Simultaneously the closure of the switch 332 applies positive voltage to the line 476 thereby "enabling" the reset circuit; however, resetting does not take place since contacts K3a of relay K3 are open.

Turning now to the bridge 465 which, as will be recalled, was energized by contact K2a on relay K2, the output serves to energize the feed clutch 32 and feed solenoid 87 of the transport mechanism (see also FIG. 1a), the circuits being completed through normally closed contacts K6a of relay K6. With the transport motor 30 in operation, the result is to produce rotation of both the initial and main sections of the feed mechanism as well as rotation of the drum 360. The machine is thus in condition to receive a check, fed by the operator into the feed station. The check, as assumed, appears as shown in FIG. 3 with no prior perforations. The check is immediately "taken over" by the discs of the transport mechanism and is crowded, as it moves, against the guide edge 45 (FIG. 6) in position for reading by the sprocket hole detector 16. Since there is no output from the detector, the "delay" relay K4 does not operate. Consequently the check simply passes on until it strikes the leading edge trip switch 354. Closure of switch 354 completes a circuit, via the normally closed contacts K4b of relay K4, to the "perforate" relay K6, opening contacts K6a and closing contacts K6b, K6c. This relay serves the dual purpose of stopping the transport and triggering the perforator for operation. Thus opening of contacts K6a deenergizes the feed clutch 32, and the simultaneous closure of contacts K6b immediately operates the feed brake 34 causing abrupt stoppage of the feed discs. Because of the location of the switch 354, stoppage of the check takes place with its leading edge located at the downstream edge of the perforator so that when the perforator is triggered for operation by closure of contacts K6c the perforated information and the accompanying sprocket holes S2 are located adjacent the leading edge of the check as desired (FIG. 3a).

When the perforator reaches the bottom of its stroke, the "head down" switch 336 is operated momentarily thereby energizing the reset solenoid 285 (see FIGS. 10 and 12) releasing the bail shaft so that it rotates through one-half revolution, with the rollers thereon wiping all of the latches 175 into retracted position where they are retained by their respective control armatures 243. Thus the rings in the perforator are all freed to return to home position. As the perforator head completes the upward stroke of its cycle, the switch 337 is momentarily closed, energizing the "reset" relay K5. Closure of contacts K5a associated with the relay K5 cause the relay to be sealed in through the leading edge trip switch 354 which is, at this point, still closed by the presence of the check which has been perforated. Contacts K5b on the relay K5, being switched to their alternate condition, release the feed brake 34 and complete the circuit to the feed clutch 32 as well as to the drum solenoid 400. The effect of closing the clutch circuit is to cause the main section of the transport mechanism 15 to rotate, while completing the circuit to the drum solenoid insures that the drum will also rotate, the two, serving together, to eject the check from the machine through the final drive rollers 421, 422 and into the keyboard-selected one of the receiving pockets.

It may be noted however, that while the transport operates to eject the check, the initial section of the transport mechanism which is under the control of the feed solenoid 87, is not energized as long as a check holds the switch 354 closed and thus the relay 146 closed. Only when the perforated check is ejected does relay K6 drop out to restore power, via contacts K6a, to the feed solenoid. Thus there is no possibility of feeding in a second check before the first "clears."

In addition to reenergizing the transport mechanism for ejection of the check, it may be noted that energization of the relay K5 serves the purpose of transferring contacts K5c to the alternate condition. Opening of the normally closed K5c contact breaks the holding circuit to the relay K2 so that the relay K2 drops out, opening contacts K2a. However, this does not affect the flow of current to the bridge 465 and ring motor 210 since the supply circuit thereto is by this time completed through the closure of the normally open one of the contacts K5c.

Above, the effect of closure of the "head down" switch 337 in energizing relay K5 has been discussed. It is to be noted also that switch 337 completes a momentary circuit through line 478 to the solenoid 225 of the single revolution clutch 215 so that the ring shaft 190, which is driven by the clutch, immediately begins its second or "homing" rotation, with the rings automatically coming to rest in home position as discussed in connection with FIGS. 10 and 12. Thus as the ring shaft of the perforator begins its second rotation, the latches 175 having been retracted by the operation of the "head down" switch 336 through the action of the reset solenoid 285, each ring rotates, either by friction or by action of the detent balls, in the direction of home position. The homing cam 300 thereon serves to cam the home release arm 302 upwardly, releasing the associated latch 175 so that the latch is free to drop into the home notch under the urging of the spring 178. As the shaft 310 approaches its final home position, the switch 334 thereon is closed for a short space of time, thus momentarily energizing the reset solenoid 285 which is associated with the bail shaft. This releases the latch 283 (FIG. 3) permitting the bail shaft 260 to undergo half a revolution so that the rollers thereon (FIG. 10) wipe all of the latches 175 back into their retracted position. This leaves the perforator in condition for receipt of new instructions.

As soon as the check clears the detector switch 354, the circuit to the relays K5 and K6 is opened. Dropout of relay K6 simply restores its contacts to the initial state while dropout of relay K5, by opening of the normally open ones of contacts K5c, breaks the existing circuit to the rectifier 465, shutting off the D.-C. power, as well as cutting off the flow of current to the ring motor 210 which comes to rest. The transport motor 30 and the connected drum 360 at the discharge end continue to rotate to insure complete ejection of the check which has been processed. The device is then restored to its initial condition.

*Condition No. 2—Prequalified check*

In the case of a prequalified check, which has prerecorded identifying information, it is sufficient for the operator to enter on the keyboard the transaction code and the amount. When the transmit button 24 on the keyboard is pressed the cycle is initiated just as previously described with the picking up of the initial relay K1 which in turn, causes picking up of relay K2 thereby starting the ring motor 210 and energizing the bridge 465 to furnish D.-C. power to the transport mechanism and to the solenoid controlling the single revolution clutch 225. Thus the ring setting shaft 190 of the perforator rotates, with commutation of the keyboard settings to the release devices associated with the ring latches, so that all of the rings are latched in desired settings. Moreover, application of direct voltage to the D.-C. buses 471, 472 energizes both the feed clutch and feed solenoid so that the check may be fed.

However, in the case of a prequalified check, sprocket holes are present with the result that the sprocket hole detector 16 produces an output signal which energizes the relay K4. The contact K4a thereof serves to seal in the relay K4 while the contacts K4b are switched to their alternate condition. Thus the normally closed one of the contacts is opened breaking the regular current supply to the relay K6 and the normally open one of the contacts is closed, thereby establishing a delay RC circuit including a large capacitor C which is in parallel with the relay coil and a resistor R which is connected in series. Consequently, even though leading edge detector switch S1 closes upon advent of a check, the relay K6 does not close. Thus the transport mechanism, instead of being deenergized by the opening of contacts K6a, remains energized so that the check is transported an additional amount "downstream," i.e., until the leading edge thereof engages the feeler member 382 at the drum 360. The crowding action of the check between the member 382 and the drum causes the member to swing backwardly on its arm 380, rotating the shaft 381 and causing the latch 386 to be moved into locking position with respect to the teeth on the ratchet wheel 387 so that the drum immediately comes to a stop. Idle slippage takes place at the slip clutch 371 which drives the drum. When the check comes to rest, the initial sprocket holes thereon are engaged with the drum sprockets and the check is, as stated, precisely positioned with respect to the perforator for the punching of sequentially registered sprocket holes.

When the relay K6 does operate, after a time interval which depends upon the constance of the RC circuit, and with current being supplied through the paper detector switch 354, the contact K6c thereof operates the perforator to apply the coded information in a position to the right and clear of the prequalifying information, just as set forth in FIG. 2a.

At the end of the downstroke of the head, closure of the contacts 336 pulses the reset solenoid 285 so that all of the latches in the perforator head are retracted, and subsequent closure of the switch 337 upon the return of the perforator head, closes the relay K5 as well as triggering the single revolution clutch 225 for homing movement of the ring shaft 190. Closure of the normally open one of the contacts K5b not only energizes the feed clutch 32 to restart the main portion of the feed mechanism, but also energizes the drum solenoid 400 so that the latch is positively retracted from the drum permitting the drum to rotate. The check is thus passed to the final rollers 421, 422 and 431, 432 and deposited in a receiving pocket depending upon which deflector solenoid has been selected.

When the tail of the check clears the switch 354, the relay K5 is deenergized thus removing the D.-C. power from bridge 465 and deenergizing the ring motor so that the perforator is again restored to an initial condition awaiting the entry of further instructions on the keyboard. When the tail of the check passes the feeler member 382, it is free to drop into the groove 383 of the drum in position to engage the leading edge of a subsequent check. In order to insure prompt drop out of the relay K6 when it is deenergized at the end of the cycle and prevent such drop out from being inhibited by the capacitor C, we prefer to employ a bleeder resistor R1 in shunt with the capacitor C and with a diode connected in series as shown in the drawing. This moreover insures that the capacitor C will be promptly discharged in readiness for the next operating cycle.

We claim:

1. In an encoding device for entering information on checks or the like at least a portion of which have prequalifying information already coded thereon in a predetermined location, the combination comprising a coding head for applying a series of coded characters, means including a keyboard for setting the coding head in accordance with information read from the face of the check, transport means for transporting the check along a reference edge to the coding head, a detector along the path of movement of the transport means having a first and second output condition depending upon the presence or absence of prequalifying information, and positioning means for positioning the check in successively located first and second positions under said coding head in accordance with the output condition from the detector so that in the case of prequalified checks the information applied by the coding head occupies a position adjacent the prequalifying information.

2. In an encoding device for entering information on checks or the like at least a portion of which have prequalifying information already coded thereon, the combination comprising a coding head for applying a series of coded characters, means including a keyboard for setting the coding head in accordance with information read from the face of the check, transport means for transporting the check along a reference edge to the coding head, a detector along the path of movement of the transport means for detecting the presence of prequalifying information, and positioning means responsive to the detector for positioning the check with respect to the coding head so that the information entered by the latter occupies a position adjacent the prequalifying information.

3. In a combined coding device and sorter for entering information on checks or the like at least a portion of which have prequalifying information already coded thereon, the combination comprising a coding head for applying a series of coded characters, means including a keyboard for setting the coding head and for producing a sort output signal in accordance with information read from the face of the check, transport means for transporting a check along a reference edge to the coding head, a sorter including a series of pockets adjacent said transport means and having a diverter mechanism for diverting a check into one of said pockets, a detector along the path of movement of the transport and having a first and second output condition depending upon the presence or absence of prequalifying information, positioning means for positioning the check in successively located first and second positions under the encoding head so that in the case of prequalified checks the information applied by the coding head is located adjacent the prequalifying information, and means for coupling the diverter mechanism for response to the sort output signal of the keyboard means so that the check is diverted into a desired one of said pockets.

4. In a perforating system for entering information on checks or the like at least a portion of which are prequalified with punched characters and an adjacent group of sprocket holes along the leading edge thereof, the combination comprising a perforator having settable punches for punching a series of characters together with punches for punching an adjacent group of spaced sprocket holes, keyboard means for setting the punches in accordance with information read from the face of the check, a discharge sprocket member adjacent the perforator, transport means for transporting the check along a reference edge to the perforator, a detector along the path of movement of said transport means for detecting the presence of prequalification holes, means associated with the detector and responsive to lack of output therefrom for stopping the check prior to engagement with said sprocket member and with its leading edge in said perforator for operation of the latter, and means associated with the detector and responsive to output therefrom for causing the check to be incrementally advanced into engagement with the sprocket member, positive stop means on the sprocket member actuated incident to the arrival of the leading edge of the check following with engagement of the sprocket holes therein for positioning the member so that the characters produced by the perforator are located adjacent the prequalification characters and so that the group of sprocket holes punched by the perforator are in sequential register with the sprocket holes associated with the prequalification characters.

5. In an encoding device for entering information on checks or the like at least a portion of which we prequalified by information already entered thereon, the combination comprising a perforator having settable punches for punching a series of characters together with punches for punching an adjacent group of spaced sprocket holes, means for setting the punches in accordance with information read from the face of the check, a discharge member having a sprocket adjacent the perforator, transport means for transporting the check along a reference edge to said perforator, a detector along the path of movement of said transport means for detecting the presence of prequalification holes, means including a switch placed in the path of movement of the check and responsive to lack of output from the detector for stopping the check with its leading edge in said perforator for punching of characters and associated sprocket holes at said leading edge, and time delay means responsive to output from the detector for causing the check to be advanced beyond the perforator and into engagement with the sprocket, positive stop means actuated incident to arrival of the leading edge of the check at the sprocket for precisely positioning the sprocket and check so that the characters punched by the perforator are located inwardly from the leading edge of the check adjacent the prequalification characters and so that the group of sprocket holes punched by the perforator are in sequential register with the sprocket holes associated with the prequalification characters.

6. In a perforating system for entering information on checks or the like, the combination comprising a perforator mechanism having means including settable rings for punching a series of characters at a perforating station, a setting mechanism associated with the perforator rings, keyboard means for entering the information to be perforated and connected to the setting mechanism, a feed station, a transport mechanism for transporting checks from the feed station to the perforating station, means operated upon completion of the setting of said rings for setting the transport mechanism in motion, means including a detector arranged along the path of movement of the check in the transport means for stopping the check at a first position or a second position in the perforating station depending upon the presence or absence of detectable information on the check.

7. In a perforating system for entering information on checks or the like a portion of which have prequalifying information at the leading edge and a portion of which do not have any prequalifying information, the method which comprises transporting a check along a predetermined path of movement, detecting the presence of prequalifying information, relatively positioning the check in a coding station and entering coded information thereon, said check being positioned in the station in a first or second position depending upon the absence or presence of prequalifying information so that the information entered on the check at the station is entered adjacent the prequalifying information and in the lack thereof adjacent the leading edge of the check.

8. In a perforating system for entering information on checks or the like a portion of which have prequalifying information in the form of punched holes with an adjacent initial set of sprocket holes at the leading edge and a portion of which do not have any prequalifying information or sprocket holes, the method which comprises transporting a check along a predetermined path of movement, detecting the presence of punched holes, producing a first or second output signal in accordance with the absence or presence of punched holes, stopping the check in a first or second position in accordance with the output signal and relative to a perforator head having character punches and associated sprocket hole punches, and perforating the check, the first position being so located that the characters and sprocket holes are punched adjacent the leading edge of the check and the second position being so located that the sprocket holes which are punched into the check are in sequential register with the initial set of sprocket holes to produce a continuous series.

9. In a perforating system for entering information on checks or the like the method which comprises punching closely adjacent the leading edge of the check prequalifying information in the form of code groups and a short initial set of sprocket holes, said sprocket holes being inset from a lateral reference edge of the check by a predetermined distance, transporting the check along its reference edge, detecting the presence of the prequalifying code groups during transport, producing an output signal incident to said detection, activating a stop member in response to the output signal to engage the initial sprocket holes, said stop member being spaced at a predetermined distance relative to a perforating head having visually legible character punches and associated sprocket hole punches so that upon operation of the perforating head visually legible characters are punched into the check in a position adjacent the prequalifying characters and so that the sprocket holes which are punched into the check are in sequential register with the initial set of sprocket holes to produce a series of sprocket holes which is smoothly continuous but which extends over a portion of the length of the check, and discharging the check after the perforating head has operated.

10. In a perforating system for entering information on checks or the like at least a portion of which have prequalifying information already entered thereon, the combination comprising a perforator head having settable rings movable from a home position for punching a series of characters, means including a keyboard for simultaneously setting the rings in accordance with the information read from the face of the check, transport means for transporting the check along a reference edge to the perforator head, means including a detector located along the path of movement of the transport means for detecting the presence of prequalifying information and for positioning the check with a clear area thereon alined with the perforator head, drive means for the perforator, control means jointly responsive to the completion of the setting of the rings in the perforator head and the positioning of the check thereunder for actuating the drive means of the perforator, and means responsive to the completion of the operation of the perforator head for ejecting the check and for restoring the rings to the home position in readiness for subsequent instruction from the keyboard.

11. In a perforating system for entering information on checks or the like the combination comprising a perforator head having settable ring means for punching a series of characters upon actuation thereof, means including a keyboard for entering information read from the face of the check order by order, means in the perforator head for rotating all of the rings simultaneously from a home position and for stopping them in selected positions in accordance with the information entered on the keyboard, means for positioning a check in alinement with the perforator head, means responsive to the completion of the setting of the rings and the positioning of the check for actuating the perforator head, and means responsive to the completion of said actuation for ejecting the check and for simultaneously resetting the rings of the perforator head to home position in readiness for further instruction from the keyboard.

12. In a perforating system for entering information on checks or the like, the combination comprising a perforator having rotatable rings indexable to set positions, means for rotating the rings simultaneously from a home position, said rings having respective magnetic latches, a multiple column keyboard for entering information read from the face of the check, the columns being so coupled to the corresponding and respective magnetic latches that the rings are latched at positions corresponding to the information entered on the keyboard, means for transporting the check to a position in which a clear area on the check is alined with the perforator head, means automatically responsive to arrival of the check and the completion of the setting of the rings for actuating the perforator head, and means for thereafter ejecting the check and resetting said rings to home position in readiness for new instructions from the keyboard.

13. In a perforating system for entering information on checks or the like, the combination comprising a perforator head having a series of settable rings, a multiple column keyboard matrix having column lines and digit lines including contact means for connecting a selected digit line to the column line in each column position, a drive shaft for rotating all of the rings simultaneously from a home position, magnetic latches cooperating with notches formed in the periphery of the respective rings so that upon actuation of a given latch the associated ring is held in a set position restrained against further movement, said latches being coupled to the respective column lines in the keyboard, a commutator switch on the drive shaft having digit contacts connected to the respective digit lines of the keyboard so that as the rings are advanced simultaneously they are latched in selected digit positions, means for positioning a check under said perforator head, means responsive to the completion of the setting movement of the rings and the positioning of the check for actuating the perforator head, and means responsive to the completion of the actuation for restoring the rings to home position.

14. In a perforating system for entering information on checks or the like, the combination comprising a perforator head having a plurality of rings arranged side by side in column positions, a drive shaft extending therethrough, means including a single revolution clutch for rotating the drive shaft, individual magnetic latches for said rings, each of said rings having a series of indexing notches about the periphery thereof for selective engagement by the associated latch, means for actuating the single revolution clutch so that all of the rings are turned simultaneously, a control matrix having a plurality of input lines and a plurality of output lines with the output lines being connected to the respective magnetic latches, and a commutator driven by the shaft for successively energizing the input lines for latching of the rings in indexed positions in accordance with the setting of the control matrix, each of said rings having a slippable drive connection with the shaft for continued rotation of the shaft after the rings are latched in stationary position.

15. In a perforating system for entering information on checks or the like, the combination comprising a perforator head having a plurality of rings arranged side by side in column positions, a drive shaft extending therethrough, a single revolution clutch connected to the shaft, individual magnetic latches for said rings, each of said rings having a series of indexing notches about the periphery thereof for selective engagement by the associated latch, means for actuating the single revolution clutch so that all of the rings are turned simultaneously from a home position, a control matrix having a plurality of input lines and a plurality of output lines with the output lines being connected to the respective magnetic latches, a commutator driven by the shaft for successively energizing the input lines for setting the rings in latched positions in accordance with the setting of the control matrix, each of said rings having an impositive drive connection with the shaft for continued rotation of the shaft after individual rings are latched in stationary position, reciprocating drive means for the head, means responsive to the setting of the rings for enabling actuation of the reciprocating drive means, and means responsive to completion of the actuation for restoring the rings to their home position.

16. In a performing system for entering information on checks or the like, the combination comprising a perforator head having a plurality of settable rings in successive column positions, a drive shaft extending through said rings and driven by a single revolution clutch, each of said rings having a series of notches formed about its periphery and having individual magnetic latches cooperating therewith, a matrix having input lines and output lines, a commutator switch coupled to the shaft and having contacts connected to the input lines, the output lines being connected to the latches so that the rings are stopped in desired digit positions determined by the setting of the matrix, and means for causing the commutator switch to be operated during alternate cycles of the clutch.

17. In a perforating system for entering information on checks or the like, the combination comprising a perforator head having a plurality of settable rings in successive column positions, a drive shaft extending through said rings and driven by a single revolution clutch, each of said rings having a series of notches formed about its periphery and having individual magnetic latches cooperating therewith, a matrix having input lines and output lines, a commutator switch coupled to the shaft and having contacts connected to the input lines, the output lines being connected to the latches so that the rings are stopped in desired digit positions determined by the setting of the matrix, means for reenergizing the clutch for return of the rings to a home position, a 2:1 step-down drive connection between the drive shaft and the commutator switch, and the commutator contacts being distributed over 180° for idle movement of the commutator switch during return to the home position.

18. In a perforating system for entering information on checks or the like, the combination comprising a perforator head having a series of settable rings for perforating characters in a plurality of column positions, means including a drive shaft extending therethrough having a single revolution clutch for driving the rings from a home position, individual magnetic latches for said rings, each of said rings having a series of index notches capable of holding the ring in a selected digit position, means including a settable matrix and timed with the rotation of the shaft for releasing the latches at digit positions determined by the setting of the matrix, means for resetting said latches following perforation, means for again energizing the single revolution clutch for driving of the rings toward home position, each of said rings having a trip member on its periphery for tripping the latch just prior to the latch reaching home position for retention of the rings in home position, and means for thereafter resetting all of the latches in readiness for a successive cycle of operation.

19. In a perforating system for entering information on checks or the like, the combination comprising a perforator head having a series of settable rings for perforating characters in a plurality of column positions, a drive shaft extending therethrough having a single revolution clutch for driving the rings, individual magnetic latches for said rings, each of said rings having a series of index notches for latching the ring in a selected digit position, means including a settable matrix and timed with the rotation of the shaft for releasing the latches at digit positions determined by the setting of the matrix, means for actuating the perforator, means for thereafter resetting said latches and for reenergizing the single revolution clutch so that the rings are driven toward home position, each of said rings having means for tripping the associated latch for retention of the rings in home position in readiness for a successive cycle of operation.

20. In a perforating system for entering information on checks or the like, the combination comprising a perforator head having a plurality of settable rings in successive column positions, a drive shaft extending through said rings and driven by a single revolution clutch, each of said rings having a series of notches formed about its periphery and having individual magnetic latches cooperating therewith, means including a matrix and timed with the rotation of the shaft for releasing the latches so that the rings are held in desired digit positions determined by the setting of the matrix, a switch shaft having first and second switches, a 2:1 step-down drive connection between said drive shaft and said switch shaft, associated control circuitry having first and second switches, said first and second switches being arranged at 180° positions with respect to said switch shaft for successive actuation during successive rotations of the driven shaft.

21. In a perforating system for entering information on checks or the like, the combination comprising a perforator mechanism having rings for punching a series of characters at a perforating station, a setting mechanism associated with the perforator rings, keyboard means for entering the information to be perforated, a main transport mechanism for transporting checks into and out of the perforating station, a feed station for feeding the checks, an initial transport mechanism for transporting the checks from the feed station to the main transport mechanism, means operated following the entry of the information on the keyboard for completing the setting of said rings and for simultaneously setting the transport mechanisms in motion, means responsive to the arrival of the check at the perforating station for stopping said transport mechanisms and for initiating the perforation, and means responsive to the completion of the perforation for temporarily reactivating the main transport mechanism for transporting the perforated check out of the perforating station while maintaining the first transport mechanism stilled to prevent transport of a check from said feed station until the perforated check has cleared the perforating station.

22. In a perforating system for entering information on checks or the like, the combination comprising a perforator mechanism having rings for punching a series of characters at a perforating station, a setting mechanism associated with the perforator rings, keyboard means for entering the information to be perforated, a transport mechanism for transporting the checks into and out of the perforating station, a feed station for feeding the checks to the transport mechanism, means on the keyboard for transmitting the keyboard settings to the setting mechanism and for simultaneously setting the transport mechanism in motion, means responsive to the arrival of the check at the perforating station for stopping said transport mechanism and for initiating the perforation, and means responsive to the completion of the perforation for transporting the perforated check out of the perforating station while temporarily preventing transport of a succeeding check from said feed station.

23. In a perforating system for entering information on checks or the like at least a portion of which have existing perforations, the combination comprising a perforator mechanism having rings for punching a series of characters at a perforating station, a setting mechanism associated with the perforator rings, keyboard means for entering the information to be perforated, a transport mechanism for transporting the checks into and out of the perforating station, a feed station for feeding the checks to the transport mechanism, means for transmitting the keyboard settings to the setting mechanism, means for positioning the transported check in the perforating station in such position that the perforations are made in a position adjacent existing perforations on the check, and means responsive to the completion of the perforation for transporting the perforated check out of the perforating station while preventing transport of a succeeding check from said feed station.

24. In a proof encoding machine or the like for use with checks having an initial set of sprocket holes starting at the leading edge thereof but extending inwardly only a limited distance from the leading edge, the combination comprising a perforator head, transport means for transporting a check along a lateral reference edge thereof into a position under the perforator head, a sprocket wheel at the outlet side of the perforator head having sprockets alined with the sprocket holes of the check and having means for driving the same at transport speed, a feeler member associated with the sprocket wheel and normally positioned to define a nip therewith in the path of movement of the check, said feeler member being mounted for bodily movement radially upon being engaged by the leading edge of a check, and means responsive to the bodily movement of the feeler member for stopping the sprocket wheel in a selected phase position with the initial ones of the sprocket holes engaged by the sprocket, said perforator head including sprocket hole punches which are so spaced with respect to the engaged sprockets that upon operation of the perforator head additional sprocket holes are formed in the check in sequential register with the initial set of holes.

25. In a perforating system for entering information on checks or the like having an initial set of sprocket holes punched closely adjacent the leading edge and spaced inwardly from a lateral reference edge by a predetermined distance the combination which comprises perforating means including a perforator head having characters and sprocket hole punches, transport means including a guide edge for transporting a check longitudinally with its reference edge in contact with the guide edge into position below said perforator head, a sprocket wheel at the outlet side of the perforator head having sprockets thereon and formed with a peripheral groove, a feeler member having its lower edge recessed in the peripheral groove and shaped to define a nip arranged in the path of movement of the leading edge of the check, the feeler member being mounted for bodily movement so that upon engagement by the leading edge of the check the feeler member is lifted out of the groove in the sprocket wheel, means for normally driving the sprocket wheel at substantially the same speed as the transport means, a latch mechanism including a set of teeth on the sprocket wheel and a latch cooperating therewith, for coupling the feeler member and the latch so that the sprocket wheel is latched against further movement upon bodily movement of the feeler member, said latch teeth having a pitch which corresponds to that of the sprockets so that the initial set of sprocket holes is in sequential register with the sprocket hole punches on the perforator head so that upon operation of the latter the initial set of sprocket holes is extended in a smoothly continuous series.

26. In a perforating system for entering information on checks or the like having an initial set of longitudinally spaced sprocket holes adjacent the leading edge, the combination comprising a perforator, a drum adjacent the perforator having sprockets spaced about its periphery and having a peripheral groove, a feeler member mounted for bodily movement having its lower edge recessed in the peripheral groove and shaped to define a nip arranged in the path of movement of the leading edge of a check, transport means for transporting a check into engagement with said nip, means including a slip clutch for rotating the drum, a latch mechanism including a set of teeth rotatable with the drum and a latch cooperating therewith, means for coupling the feeler member to the latch so that upon engagement by the leading edge of the check the feeler member is lifted out of the groove accompanied by engagement of the latch for positive and immediate stoppage of the drum and check and with the check engaged by the sprockets for precise positioning of the check with respect to the perforator, means responsive to operation of the perforator for releasing the latch so that the drum is free to rotate for ejection of the check.

27. In a perforating system for entering information on checks or the like, the combination comprising a perforator, a drum adjacent the perforator and defining a peripheral groove in its surface, a feeler member mounted for bodily movement and having its lower edge recessed in the peripheral groove and shaped to define a nip arranged in the path of movement of the leading edge of a check, means including a slip clutch for rotating the drum, a latch mechanism including a set of teeth coupled to the drum and a latch cooperating therewith, means for coupling the feeler member to the latch so that upon engagement by the leading edge of the check the feeler member is crowded out of the groove accompanied by engagement of the latch for positive and immediate stoppage of the drum and check, and means for subsequently releasing the latch so that the drum is free to rotate for ejection of the check

References Cited by the Examiner

UNITED STATES PATENTS

| 2,745,493 | 5/1956 | Furman et al. | 234—28 |
| 2,993,642 | 7/1961 | Fender et al. | 234—99 X |
| 3,131,857 | 5/1964 | Dreyer et al. | 234—100 |
| 3,138,322 | 6/1964 | Orlando | 234—100 |

WILLIAM S. LAWSON, *Primary Examiner.*